United States Patent
Wang et al.

(10) Patent No.: US 12,323,846 B2
(45) Date of Patent: Jun. 3, 2025

(54) METHODS FOR ENABLING A LOW BANDWIDTH WIRELESS DEVICE TO ACCESS A NEW RADIO CELL VIA A WIDEBAND CONTROL RESOURCE SET

(71) Applicant: Telefonaktiebolaget LM Ericsson (PUBL), Stockholm (SE)

(72) Inventors: Yi-Pin Eric Wang, Fremont, CA (US); Xingqin Lin, San Jose, CA (US); Yutao Sui, Solna (SE); Mohammad Mozaffari, Fremont, CA (US); Luca Feltrin, Solna (SE); Yi-Ju Chen, Solna (SE); Andreas Höglund, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 334 days.

(21) Appl. No.: 17/782,325

(22) PCT Filed: Dec. 4, 2020

(86) PCT No.: PCT/SE2020/051168
§ 371 (c)(1),
(2) Date: Jun. 3, 2022

(87) PCT Pub. No.: WO2021/126045
PCT Pub. Date: Jun. 24, 2021

(65) Prior Publication Data
US 2023/0007524 A1    Jan. 5, 2023

Related U.S. Application Data

(60) Provisional application No. 62/948,680, filed on Dec. 16, 2019.

(51) Int. Cl.
*H04W 28/02* (2009.01)

(52) U.S. Cl.
CPC .............. *H04W 28/0215* (2013.01)

(58) Field of Classification Search
CPC ................................. H04W 28/0215
See application file for complete search history.

(56) References Cited

U.S. PATENT DOCUMENTS

| 12,035,418 B2* | 7/2024 | He .................. H04W 48/16 |
| 2017/0134124 A1 | 5/2017 | Lee et al. |

(Continued)

FOREIGN PATENT DOCUMENTS

| CN | 111869268 A | 10/2020 |
| CN | 111901835 A | 11/2020 |
| WO | 2020 164095 A1 | 8/2020 |

OTHER PUBLICATIONS

PCT International Search Report issued for International application No. PCT/SE2020/051168—Mar. 31, 2021.

(Continued)

*Primary Examiner* — Shukri Taha
(74) *Attorney, Agent, or Firm* — Baker Botts L.L.P.

(57) ABSTRACT

A method by a reduced capability wireless device includes receiving system information from a network node. The system information comprising information specific to the reduced capability wireless device. The reduced capability wireless device performs an operation using at least the information specific to the reduced capability wireless device received in the system information.

23 Claims, 19 Drawing Sheets

(56) References Cited

U.S. PATENT DOCUMENTS

| | | | |
|---|---|---|---|
| 2017/0188343 A1* | 6/2017 | Nguyen | H04L 5/0094 |
| 2018/0027483 A1* | 1/2018 | You | H04L 5/0053 370/336 |
| 2018/0092027 A1 | 3/2018 | Sheng | |
| 2019/0089474 A1 | 3/2019 | Ly et al. | |
| 2019/0223160 A1 | 7/2019 | He et al. | |
| 2021/0266970 A1* | 8/2021 | Lei | H04W 48/14 |
| 2023/0008141 A1* | 1/2023 | Ai | H04W 48/12 |
| 2023/0140310 A1* | 5/2023 | Koskinen | H04L 5/0048 370/329 |

OTHER PUBLICATIONS

PCT Written Opinion of the International Searching Authority issued for International application No. PCT/SE2020/051168—Mar. 31, 2021.

* cited by examiner

METHODS FOR ENABLING A LOW BANDWIDTH WIRELESS DEVICE TO ACCESS A NEW RADIO CELL VIA A WIDEBAND CONTROL RESOURCE SET

PRIORITY

This nonprovisional application is a U.S. National Stage Filing under 35 U.S.C. § 371 of International Patent Application Serial No. PCT/SE2020/051168 filed Dec. 4, 2020 and entitled "METHODS FOR ENABLING A LOW BANDWIDTH WIRELESS DEVICE TO ACCESS A NEW RADIO CELL VIA A WIDEBAND CONTROL RESOURCE SET" which claims priority to U.S. Provisional Patent Application No. 62/948,680 filed Dec. 16, 2019 both of which are hereby incorporated by reference in their entirety.

TECHNICAL FIELD

The present disclosure relates, in general, to wireless communications and, more particularly, systems and methods for enabling a low bandwidth wireless device to access a New Radio (NR) cell via a wideband of Control Resource Set (CORESET).

BACKGROUND

New Radio (NR) refers to a wireless technology that allows for connecting wireless devices, such as user equipment (UEs), to a network. In NR, the network delivers system information (SI) to a UE through a master information block (MIB) and system information blocks (SIBs). The MIB is transmitted on the Physical Broadcast Channel (PBCH). The MIB contains a small amount of information necessary for the UE to receive the remaining system information in the SIBs. Among other pieces of information, the MIB contains the configuration of Control Resource Set #0 (CORESET #0) and Search Space #0. The CORESET provides a time-frequency region where the UE monitors for a Physical Downlink Control Channel (PDCCH). The Search Space defines monitoring locations of the CORESET in time.

The structure of the MIB is specified in the standard and the format cannot change between releases as this will break backwards compatibility. In the current NR specification, the smallest possible CORESET #0 size in the frequency domain is 24 resource blocks (RBs). The MIB occupies 20 RBs. Currently, except for one reserved bit, all the bits in the MIB have a specific meaning defined in the NR standard.

SI messages, other than the SI in the MIB, are scheduled in a similar way as normal data transmission, but SI messages are repeated periodically by being scheduled in an SI window. A PDCCH indicates to the UE that the Physical Downlink Shared Channel (PDSCH) is to be received and the PDSCH contains the SI message (containing one or more SIBs).

Low-cost and/or low-complexity UE implementations are needed for the 5th Generation (5G) system, for example, to facilitate deployment of a massive number of industrial sensors or wearable devices. Currently, NR-Light is used as the running name for the discussion of such low-complexity UEs in the third generation partnership project (3GPP). NR-Light is a new feature that is currently under discussion and could be introduced as early as in 3GPP Release 17 for supporting reduced capability (RedCap) devices in a 5G network. NR-Light is intended for use cases that do not require a device to support full-fledged NR capability and International Mobile Telecommunications-2020 (IMT-2020) performance requirements. For example, the data rate for NR-Light does not need to reach above 1 Gbps, and the latency does not need to be as low as 1 ms. By relaxing the data rate and latency targets, NR-Light allows low-cost and/or low-complexity UE implementation. In 3GPP Release 15, an NR UE is required to support 100 MHz carrier bandwidth in frequency range 1 (from 410 MHz to 7125 MHz) and 200 MHz carrier bandwidth in frequency range 2 (from 24.25 GHz to 52.6 GHz). For NR-Light UEs, supporting 100 MHz or 200 MHz bandwidth is superfluous. For example, a UE bandwidth of 8.64 MHz might be sufficient if the use cases do not require a data rate higher than 20 Mbps. Reduced UE bandwidth results in complexity reduction and possibly energy consumption reduction as well. However, reduced UE bandwidth may cause problems for the NR-light UE when accessing the NR system, as certain channels in NR have a minimum bandwidth requirement.

There currently exist certain challenge(s). For example, although configuring a wide CORESET #0 bandwidth can be advantageous in terms of coverage and scheduling capacity, the wide CORESET #0 bandwidth creates a problem for a low-complexity UE that only supports UE bandwidths that are smaller than the bandwidth required for CORESET #0.

SUMMARY

Certain aspects of the present disclosure and their embodiments may provide solutions to these or other challenges. For example, this disclosure describes methods and systems for enabling a low-complexity reduced capability (RedCap) user equipment (UE) such as, for example, a New Radio-Light UE (NR-Light UE) to access a New Radio (NR) cell even when the CORESET #0 of the NR cell is configured to a wider bandwidth than the maximum supported bandwidth of the low-complexity UE (e.g., NR-Light UE).

According to certain embodiments, a method by a reduced capability wireless device includes receiving system information from a network node. The system information comprising information specific to the reduced capability wireless device. The reduced capability wireless device performs an operation using at least the information specific to the reduced capability wireless device received in the system information.

According to certain embodiments, a reduced capability wireless device includes processing circuitry configured to receive system information from a network node. The system information comprising information specific to the reduced capability wireless device. The processing circuitry is configured to perform an operation using at least the information specific to the reduced capability wireless device received in the system information.

According to certain embodiments, a method by a network node includes sending system information to a reduced capability wireless device. The system information includes information specific to the reduced capability wireless device.

According to certain embodiments, a network node includes processing circuitry configured to send system information to a reduced capability wireless device. The system information includes information specific to the reduced capability wireless device.

Certain embodiments may provide one or more of the following technical advantage(s). Certain embodiments enable a low bandwidth UE to access an NR cell which configures a CORESET #0 bandwidth larger than the maximum bandwidth supported by the UE. Thus, a CORESET #0 can be configured with a bandwidth wider than the bandwidth supported by NR-Light UEs.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
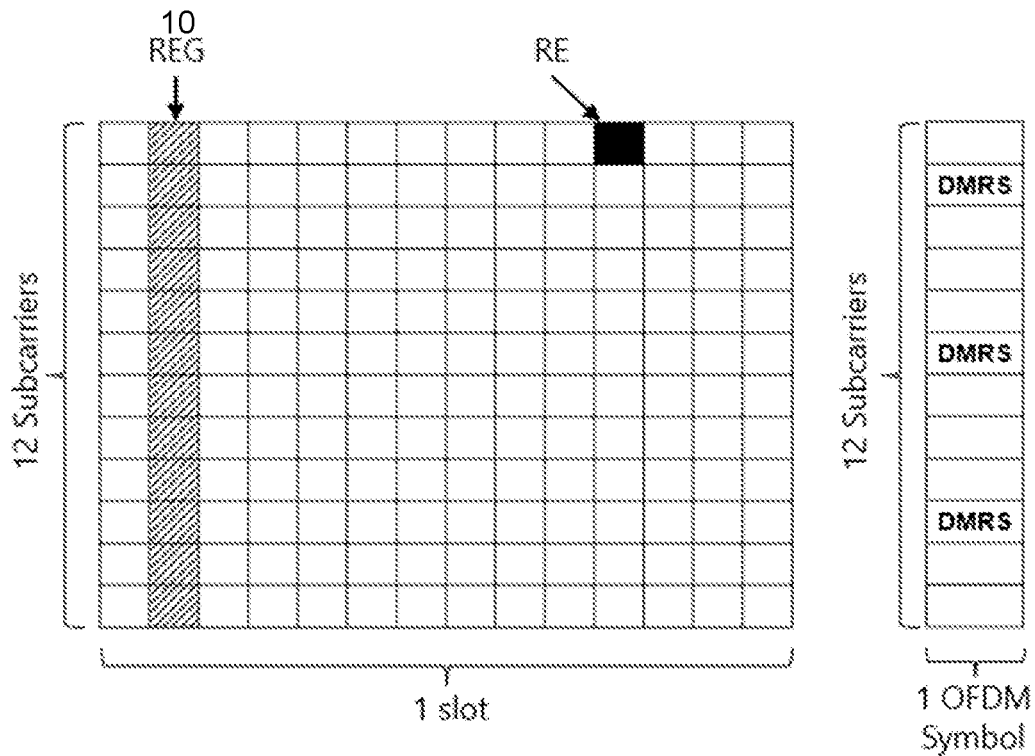
FIG. 1 illustrates one Resource Element Group (REG), according to certain embodiments.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In NR, one of the initial access steps is for the UE to acquire system information block type 1, SIB1 (SIB1 is acquired after the UE acquires MIB), which is scheduled through PDCCH using Search Space #0 associated with CORESET #0. In NR, CORESET #0 has bandwidths 4.32 MHz, 8.64 MHz, or 17.28 MHz in frequency range 1 (FR1), and bandwidths 34.56 MHz or 69.12 MHz in frequency range 2 (FR2). The number of symbols used for CORESET #0 can be 1, 2, or 3. The bandwidth of CORESET #0 depends on the subcarrier spacing indicated in MIB (by parameter subCarrierSpacingCommon) and is configured by the network. For example, if CORESET #0 uses 30 kHz subcarrier spacing for PDCCH, the bandwidth of CORESET #0 can be either 8.64 MHz or 17.28 MHz depending on whether the ControlResourceSetZero information element configured 24 RBs or 48 RBs for CORESET #0.

The network may choose either bandwidth option. Between the two options, some implementation consideration may favor the configuration of 17.28 MHz bandwidth for CORESET #0. For example, with 30 kHz subcarrier spacing and 17.28 MHz CORESET #0 bandwidth, the PDCCH can operate with aggregation level (AL) 16, which offers the highest PDCCH coverage when only one symbol is used for CORESET #0. In comparison, if only one symbol is used, configuring CORESET #0 with bandwidth 8.64 MHz can only support AL 8 when the PDCCH is configured with 30 kHz subcarrier spacing, which results in approximately 3 dB coverage reduction compared to AL 16. Furthermore, using a higher CORESET #0 bandwidth gives rise to higher scheduling capacity. Using 17.28 MHz bandwidth, however, may result in CORESET #0 not being useable by low-complexity UEs (e.g., NR-Light UEs) that only support smaller UE bandwidths, especially considering that currently only an interleaved resource mapping is supported by CORESET #0, which means a PDCCH candidate may not use contiguous RBs, resulting in a PDCCH candidate spreading out in the frequency domain within the CORESET #0 bandwidth.

A PDCCH mapped to resources in CORESET #0 may be used to transmit downlink control information (DCI) that schedules a PDSCH carrying SIB1. In that case, the DCI is masked with an SI-RNTI (meaning that the CRC of PDCCH is scrambled with the SI-RNTI).

Currently, NR schedules SIBs using DCI format 1_0 with the CRC scrambled by the SI-RNTI. The format of DCI format 1_0 with CRC scrambled by SI-RNTI for scheduling SIB1 is given in Table 1.

TABLE 1

DCI format 1_0 with CRC scrambled by SI-RNTI which used to schedule SIB1

| Field (Item) | Bits | Reference |
| --- | --- | --- |
| Frequency domain resource assignment | Variable | Variable with DL BWP N_RB $[\log_2(N_{RB}^{DL,\, BWP}(N_{RB}^{DL,\, BWP} + 1)/2)]$ $N_{RB}^{DL,\, BWP}$ indicates the size of CORESET 0 |
| Time domain resource assignment | 4 | Carries the row index of the items in Default PDSCH time domain table given in 38.214 |
| VRB-to-PRB mapping | 1 | According to 38.212 Table 7.3.1.1.2-33 0: Non-Interleaved 1: Interleaved |
| Modulation and coding scheme | 5 | 38.214 - Table 5.1.3.1-1: MCS index table 1 for PDSCH |
| Redundancy Version | 2 | |
| System Information Indicator | 1 | 0: SIB1 1: SI messages |
| Reserved | 15 | Reserved |

The largest CORESET #0 allocation is 96 RBs. Thus, the frequency domain resource assignment field takes at most 13 bits. As a result, the length of DCI format 1_0 with CRC scrambled by SI-RNTI is no more than 41 bits.

A DCI can be transmitted in the PDCCH using control channel element (CCE) AL 1, 2, 4, 8, and 16. For SIB1 acquisition, the UE monitors Type0-PDCCH common search space (CSS). A Type0-PDCCH CSS candidate however can have either AL 4, 8, or 16. A CCE consists of 6 resource element groups (REGs), and each REG has 12 resource elements (REs) in one resource block in one orthogonal frequency-division multiplexing (OFDM) symbol.

FIG. 1 illustrates one REG 10, according to certain embodiments. Three of the REs in the REG 10 are used for transmitting demodulation reference signal (DMRS), which is used for the UE to estimate the channel coefficients. The remaining 9 REs are used for mapping the information-bearing quadrature phase shift keying (QPSK) symbols. Thus, for each CCE, there are 54 information-bearing QPSK symbols, corresponding to 108 coded bits.

According to certain embodiments described herein, methods and systems are provided for enabling a low-complexity UE to use the existing synchronization signal block (SSB) to access an NR cell even when the CORESET #0 of the NR cell is configured to a wider bandwidth than the maximum UE supported bandwidth. The SSB refers to the combination of Synchronization Signal (SS) (both the primary SS and the secondary SS) and Physical Broadcast Channel (PBCH). The PBCH carries the MIB, and the CORESET #0 is configured in the MIB. Certain embodiments disclosed herein may refer to UEs with reduced capabilities as "low-complexity UEs," "low-cost UEs," "NR-Light UEs," "NR MTC UEs," or "reduced capability NR devices," for example. These types of UEs may have a maximum supported UE bandwidth that is less than the bandwidth configured, e.g., for CORESET #0.

In order for the NR-Light UEs to access an NR cell even when the CORESET #0 of the NR cell is configured to a wider bandwidth than the maximum UE supported bandwidth, certain embodiments disclosed herein may assume that the NR-Light UE can receive the same SIB1 (or eSIB1 as defined below) as the legacy UE. The challenge is the bandwidth difference between the two type of UEs, i.e., the legacy NR UEs and the low-complexity UE with reduced bandwidth.

In general, if a cell supports both legacy UEs and low-complexity UEs, the cell has to transmit the necessary information for both types of UEs to access the system. If the SSB of the legacy UE is reused for the low-complexity UE, certain embodiments of the present disclosure assume that, in addition to transmitting the legacy SIB1 information intended for legacy UEs or UEs supporting a bandwidth equal to or wider than the CORESET #0 bandwidth, the network transmits additional information elements specifically intended for NR-Light UEs. These additional NR-Light specific information elements can be added to the legacy SIB1, which will be referred to herein as an extended SIB1 (eSIB1 using ASN.1 extension of the message contents). Thus, the legacy SIB1 is extended to include information elements specifically intended for NR-Light UEs. In particular, an eSIB1 may include one or more of the information elements in the legacy SIB1 as well as one or more of the new NR-Light specific information elements. The structure of the eSIB1 is arranged in a way that it can be read and used both by the legacy UE and the low-complexity UE, e.g., the legacy UE does not act on the added NR-Light specific information elements.

In a particular embodiment, the eSIB1 may be scheduled using the same legacy DCI format 1_0 with cyclic redundancy check (CRC) scrambled by System Information-Radio Network Temporary Identifier (SI-RNTI).

Figure 2:
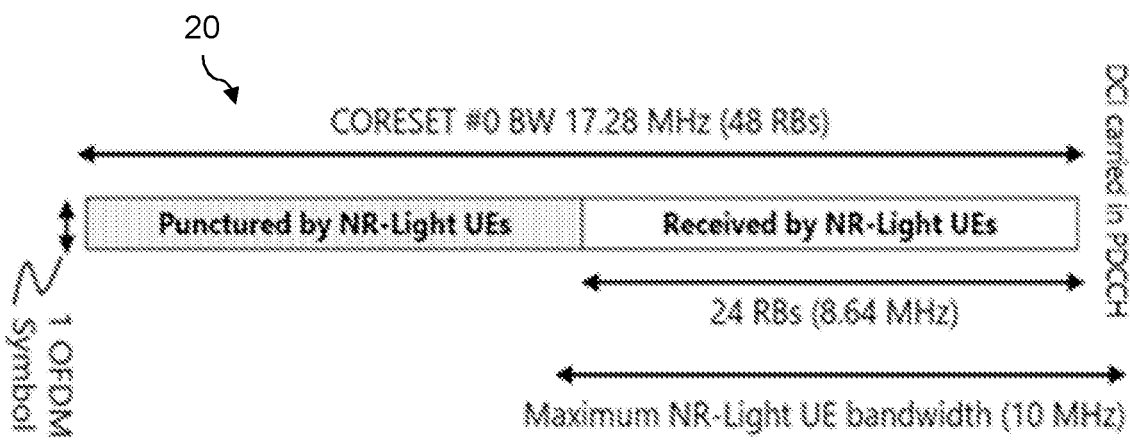
FIG. 2 illustrates an example of a New Radio-Light User Equipment (NR-Light UE) receiving a subset of CORESET #0 Resource Blocks (RBs) and treating the RBs that it does not receive as punctured, according to certain embodiments.

In a particular embodiment, the DCI for scheduling eSIB1 may be transmitted using PDCCH that spans over a bandwidth wider than the maximum NR-Light UE supported bandwidth. For example, the maximum NR-Light UE supported bandwidth may be 10 MHz, while the PDCCH with AL 16 spans over 48 RBs, which amount to 17.28 MHz with 30 kHz subcarrier spacing. According to this example embodiment, the NR-Light UE receives X out of Y RBs, where the X RBs have a frequency span equal to or less than the maximum NR-Light UE supported bandwidth. For example, with 30 kHz subcarrier spacing, Y may be 48, corresponding to 17.28 MHz bandwidth, and X may be 24 and has a span of 8.64 MHz, which is within the maximum NR-Light UE supported bandwidth of 10 MHz. In a particular embodiment, the NR-Light UE treats the (Y-X) RBs that it does not receive as "punctured". The UE sets the soft values of the corresponding coded bits carried in the punctured RBs to zero. These coded bits are said to be punctured. FIG. 2 illustrates an example 20 of an NR-Light UE receiving a subset of CORESET #0 RBs and treating the RBs that it does not receive as punctured, according to certain embodiments. The example in the FIG. 2 assumes 30 kHz subcarrier spacing. However, this particular example is not limiting and, in fact, any RBs may be punctured. For example, in a particular embodiment, the RBs at both edges can be punctured.

Figure 3:
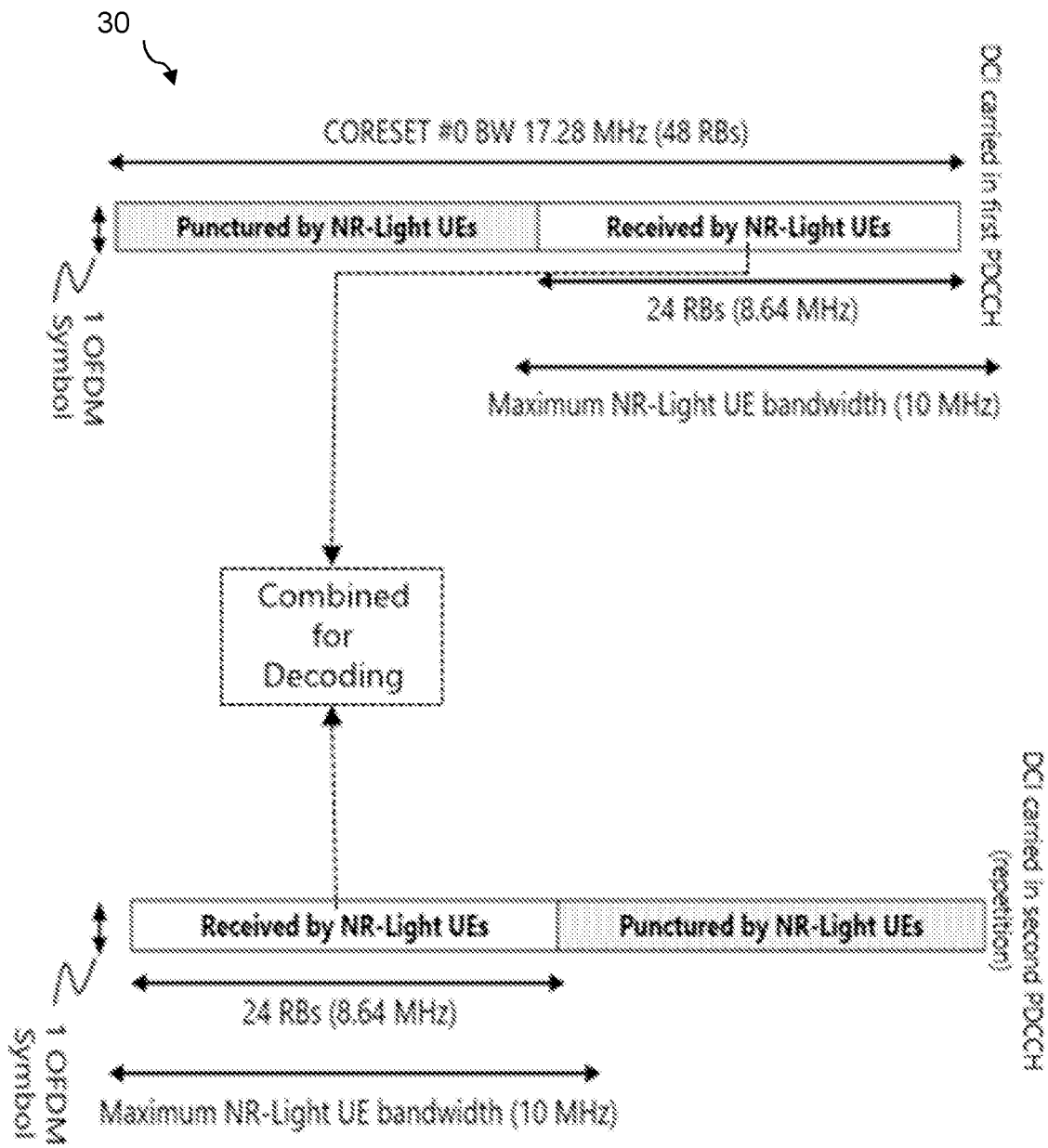
FIG. 3 illustrates such an example where the punctured coded bits are eliminated, according to certain embodiments.

According to another particular embodiment, the PDCCH used for scheduling eSIB1 may be repeated and the NR-Light UE alternates the puncturing patterns so that when it combines the received signals over two or more PDCCH repetitions the number of punctured coded bits is reduced. In fact, it is possible to eliminate the punctured coded bits. FIG. 3 illustrates such an example where the punctured coded bits are eliminated. In particular, FIG. 3 illustrates an example 30 of an NR-Light UE receiving multiple repetitions of PDCCH carrying the DCI that schedule PDSCH for eSIB1 transmission, alternating the puncturing patterns across repetitions, and combining the received signals from multiple repetitions to reduce the number of punctured coded bits. In the example of FIG. 3, a 30 kHz subcarrier spacing is assumed.

There are two alternatives for the repetitions. In the first alternative, the next generation NodeB (gNodeB (gNB), the base station in NR) can be configured to schedule additional PDCCH repetitions in relation to the legacy PDCCH whenever NR-Light and reduced bandwidth UEs are supported in the cell. These can have a pre-determined offset to the legacy PDCCH transmission. If NR-Light support is indicated in MIB or by other means in the cell, this could implicitly mean that such pre-determined repetition is applied for PDCCH (if the bandwidth of CORESET #0 is wider than the maximum bandwidth of the NR-Light UE). The repetition may follow a certain specific frequency hopping pattern within the configured CORESET #0 bandwidth.

In the second alternative, no additional repetitions are introduced. Instead, the UE relies on SIB1 being system information that will be transmitted repeatedly in the cell. That is, the same SIB1 content may be transmitted several times during a time period over which the UE can accumulate. As an example, SIB1 may be transmitted every 20 ms, which would enable the UE to accumulate and combine up to 8 repetitions in a 160 ms window for decoding. In another example, the SIB1 transmission could be assumed to be unchanged during the entire modification period (e.g., 160 ms period).

The above repetition may compensate for the loss due to puncturing and make AL=16 applicable also to NR-Light and reduced bandwidth UEs.

Figure 4:
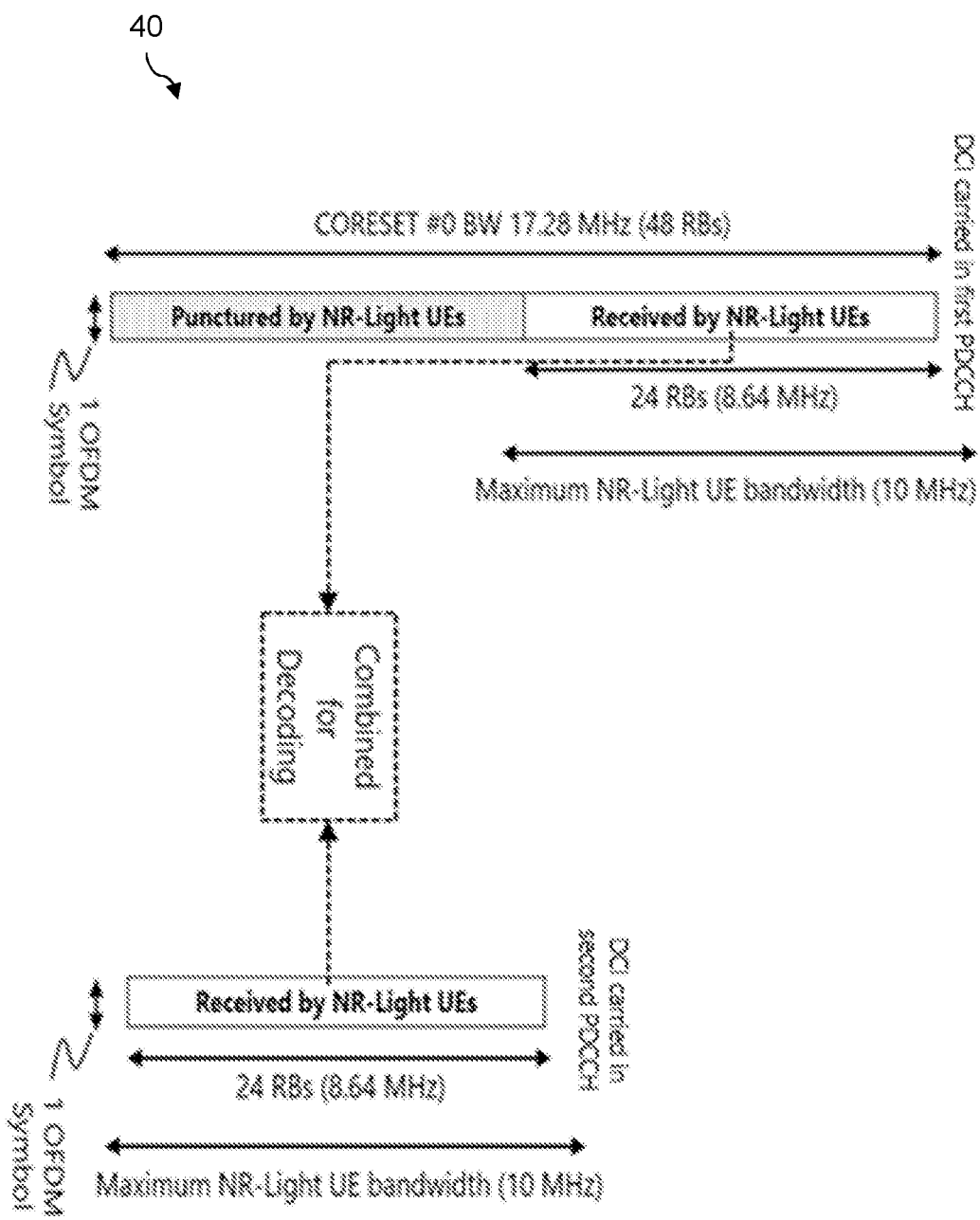
FIG. 4 illustrates an example of an NR-Light UE receiving multiple repetitions of Physical Downlink Control Channel (PDCCH) carrying the Downlink Control Information (DCI) that schedule Physical Downlink Shared Channel (PDSCH) for an extended System Information Block of type 1 (eSIB1) transmission and combining the received signals from multiple repetitions to reduce the number of punctured coded bits, according to certain embodiments.

According to certain other embodiments, a method by the network node is provided for transmitting an extra repetition specifically for NR-Light UEs. According to this embodiment, the network node only repeats the RBs that the NR-Light UE has punctured in its previous PDCCH reception. The network node and the UE need to agree on which RBs will be punctured. As an example, and not as a limitation, the network and UE may agree that the lower (Y-X) RBs are punctured in the $1^{st}$ transmission. Which portion of the initial transmission is punctured may be specified in a technical specification. FIG. 4 illustrates an example 40 of an NR-Light UE receiving multiple repetitions of PDCCH carrying the DCI that schedule PDSCH for eSIB1 transmission and combining the received signals from multiple repetitions to reduce the number of punctured coded bits, according to certain embodiments. The network transmits a repetition for the NR-Light UE to recover from the puncturing it has applied in the initial transmission. The example illustrated in FIG. 4 assumes kHz subcarrier spacing; however, this example is not intended to be limiting. In fact, any PRBs can be punctured. In a particular example embodiment, the PRBs at both edges can be punctured.

Note that when a UE receives DCI scheduling a PDSCH that the UE is to receive, the DCI indicates the slot offset $K_0$ between the PDCCH and the scheduled PDSCH, among other things. If PDCCH repetitions are confined in the same slot, there is no ambiguity in interpreting the meaning of the slot offset $K_0$. If the PDCCH repetitions span across slots, how to interpret the slot offset $K_0$ needs to be defined. In one embodiment, the slot offset $K_0$ indicates the slot offset between a reference slot and the slot in which PDSCH carrying eSIB1 is scheduled. In one example, the reference slot is the slot containing the first PDCCH repetition. In another example, the reference slot is the slot containing the last PDCCH repetition.

In the case using PDCCH repetition, symbol level repetition is preferred. In this case, the frequency and/or domain resource assignment of the eSIB1 indicated in the DCI is at a place that does not overlap with the repeated PDCCH symbol. If there are no such resources available, there can be a partial overlap, and a dropping rule needs to be defined such as, for example, whether the overlapping part needs to be PDCCH transmission or PDSCH transmission. Either the repeated PDCCH can partly puncture the PDSCH or the overlapped PDCCH resource elements (subcarriers) are dropped by the UE. Alternatively, the resource elements used by the repeated PDCCH may be indicated as reserved resources and the PDSCH rate-around them.

Figure 5:
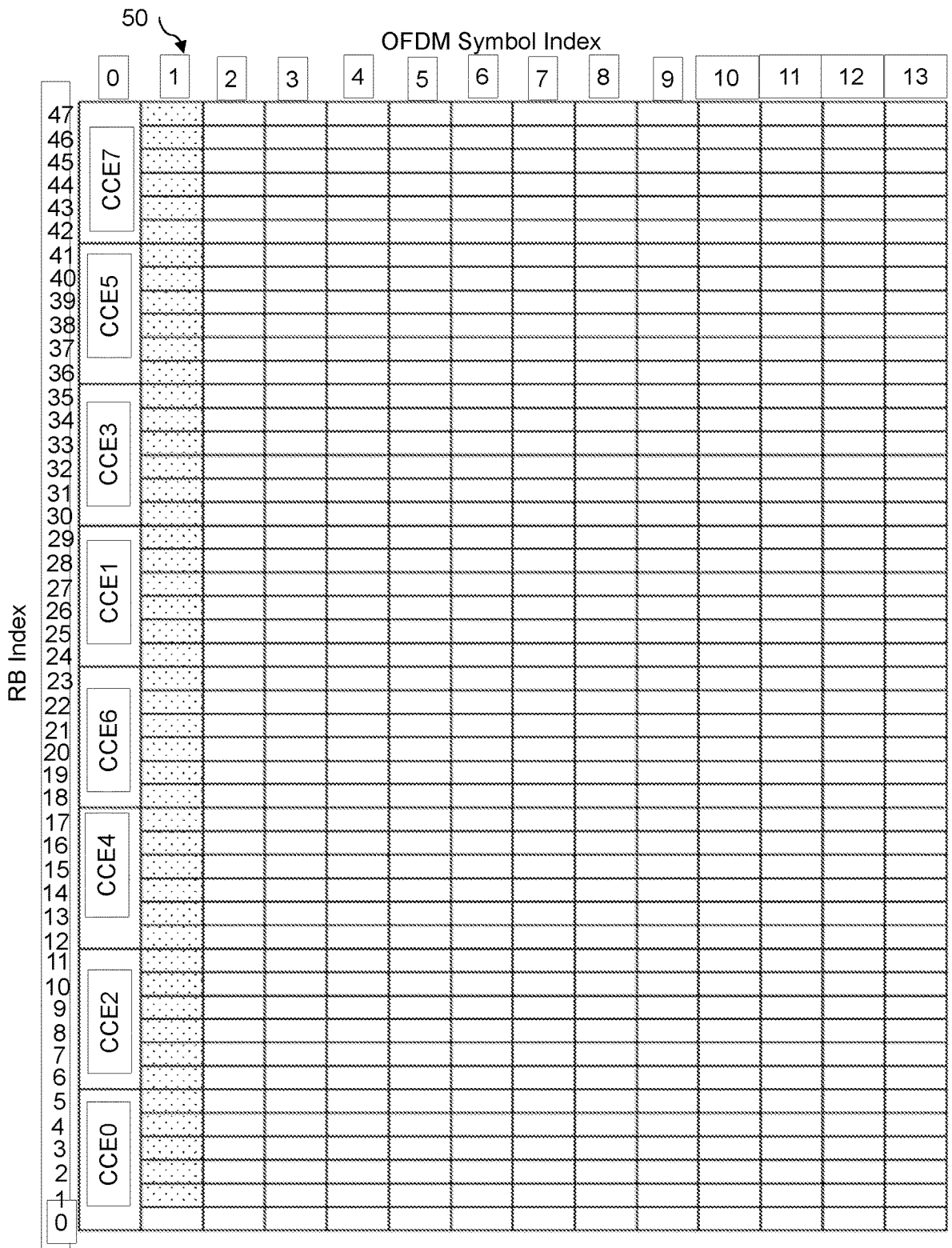
FIG. 5 illustrates an example Orthogonal Frequency Division Multiplexing (OFDM) symbol index where the network node configures 48 RBs and one OFDM symbol for CORESET #0, according to certain embodiments.

Another solution is to configure more symbols for the CORESET #0 for the legacy UE than what is needed for PDCCH coverage. For example, assume AL 8 is sufficient for PDCCH coverage. FIG. 5 illustrates an example OFDM symbol index 50 where the network node configures 48 RBs and one OFDM symbol for CORESET #0, according to certain embodiments.

Figure 6:
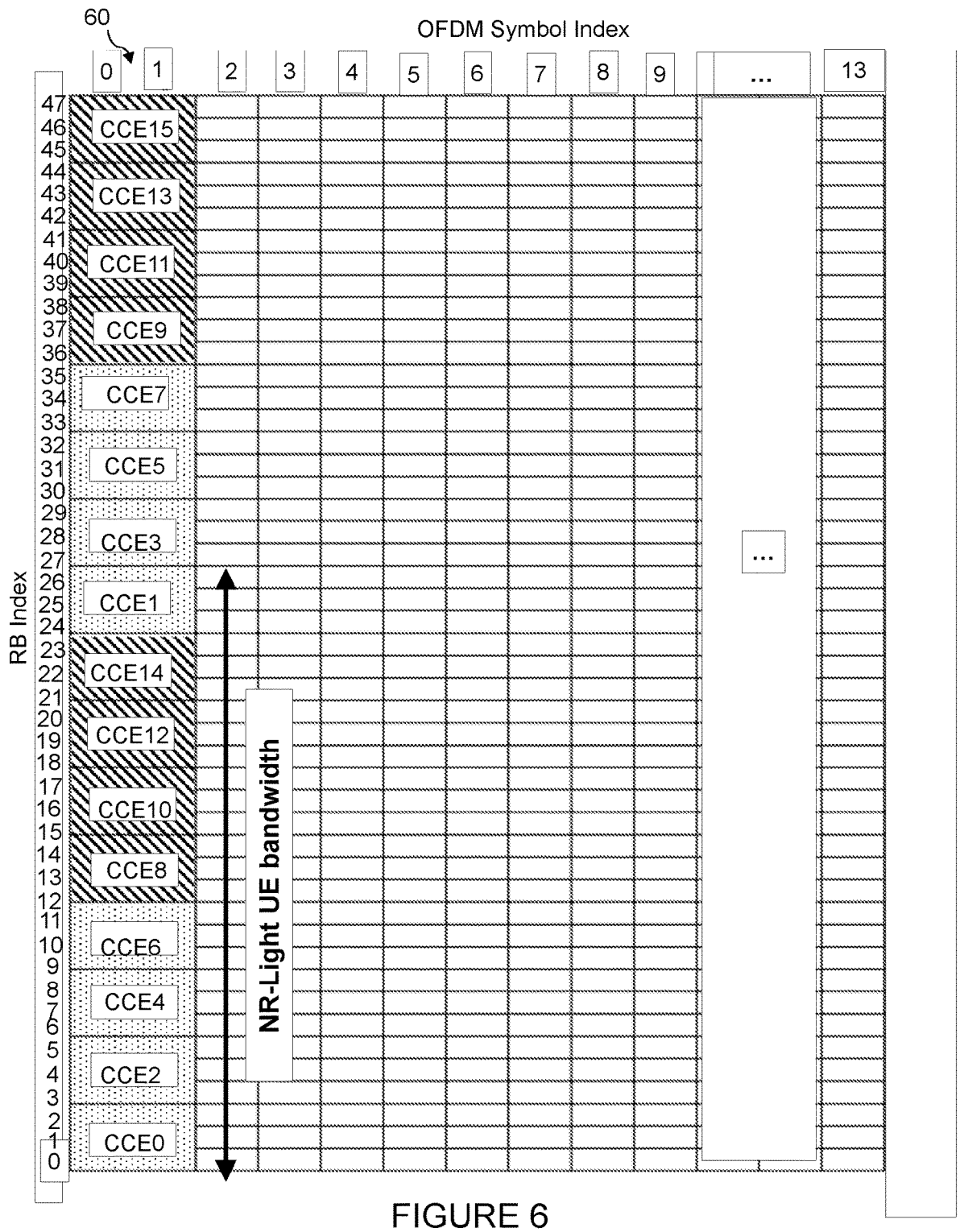
FIG. 6 illustrates an example where the network configures CORESET #0 to have 48 RBs and 2 OFDM symbols, according to certain embodiments.

In another embodiment, to support PDCCH repetition for NR-Light UEs, the network can instead configure CORESET #0 to have 48 RBs and 2 OFDM symbols. FIG. 6 illustrates such an example 60, according to certain embodiments. Specifically, in the example, {CCE0, CCE1, . . . . CCE7} can be used for PDCCH transmissions of AL 8. A subset of {CCE8, CCE9, . . . , CCE15} can be used for transmitting PDCCH repetitions for NR-Light UEs. For example, due to bandwidth constraint, CCE3, CCE5, and CCE7 may not be received by the NR-Light UEs. These CCEs can be repeated in the same slot using the resource elements assigned to CCE8, CCE10, and CCE12, respectively.

Figure 7:
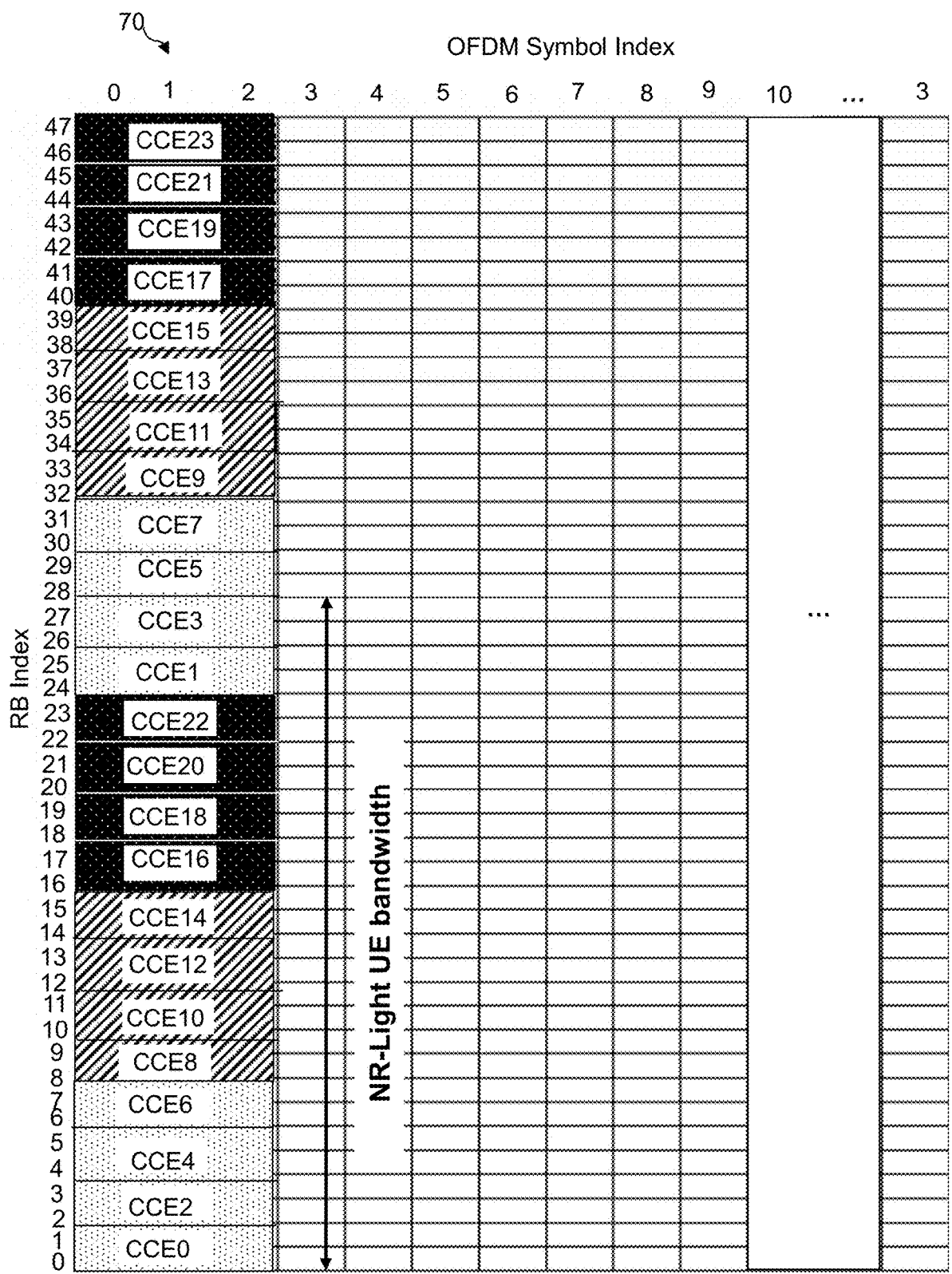
FIG. 7 illustrates another example wherein the network intends to support PDCCH up to AL 16 and configures CORESET #0 to have 48 RBs and 3 OFDM symbols, according to certain embodiments.

According to certain embodiments, unused CCE resources may be used for transmitting PDCCH and/or PDCCH repetitions and/or PDCCH repetitions for the previously punctured portion (partly or fully) for NR-Light UEs. To this end, FIG. 7 illustrates another example 70 wherein the network intends to support PDCCH up to AL 16 and configures CORESET #0 to have 48 RBs and 3 OFDM symbols, according to certain embodiments. In the example embodiment, {CCE0, CCE1, . . . . CCE15} are used for PDCCH transmissions of AL 16. A subset of {CCE16, CCE17, . . . , CCE23} can be used for transmitting PDCCH repetitions for NR-Light UEs. For example, due to bandwidth constraint, CCE5, CCE7, CCE9, CCE11, CCE13, and CCE15 may not be received by the NR-Light UEs. One or more of these CCEs can be repeated using the resource elements assigned to CCE16, CCE17, . . . , and CCE23.

An aggregation level determines the resource elements used to send the PDCCH. Higher aggregation levels require more CCEs. AL 1 needs 1 CCE, AL2 needs 2 CCEs, AL4 needs 4 CCEs, AL8 needs 8 CCEs, and AL16 needs 16 CCEs. Each CCE consists of 6 Resource Element Groups (REGs), and one REG is made up of one resource block (12 resource elements in frequency domain) and one OFDM symbol in time domain.

Therefore, when more symbols are used for PDCCH, more CCEs are available to be used for higher aggregation levels. As discussed above, FIGS. 5, 6, and 7 illustrate examples when one, two, or three OFDM symbols are used for PDCCH transmission, respectively. As can be seen, increasing the number of OFDM symbols used for PDCCH transmission allows more CCEs to be supported. Also, due to the frequency and time mapping of the REGs, by increasing the number of OFDM symbols used per CCE, each CCE uses less bandwidth (still 6 REGs per CCE but it expands in time first and then frequency). Accordingly, an NR light UE may receive more CCEs within its maximum supported bandwidth, and higher aggregation levels can be supported within its bandwidth. Compare FIG. 6 (wherein configuring 2 OFDM symbols per CCE allows the NR light UE to receive nine CCEs within its maximum supported bandwidth) and FIG. 7 (wherein configuring 3 OFDM symbols per CCE allows the NR light UE to receive fourteen CCEs within its maximum supported bandwidth). As can be seen in FIGS. 5-7, the CCEs are not required to be arranged in continuous order (e.g., CCE0 may be followed by CCE2, rather than CCE1, along the Resource Block (RB) Index).

Note that the feature of these embodiments to be applicable only when gNB "configure more symbols for the CORSET #0 for the legacy UE than what is needed for PDCCH coverage" is only valid for the scheduling of eSIB. That is, the PDCCH transmission scheduling the eSIB should be decodable both by legacy UEs and NR-Light UEs.

The DCI is used for scheduling PDSCH for eSIB1 transmission. According to certain embodiments disclosed herein, the same PDSCH that carries SIB1 information also carries information elements for NR-Light UEs, i.e., information elements intended for NR-Light UEs are added to SIB1, making it eSIB1. As NR-Light information elements are not anticipated by the legacy UEs, they legacy UE does not need to act upon receiving this information. This is typically the case for an ASN.1 extension, it will be ignored by legacy UEs. According to one aspect of the present disclosure, the PDSCH that carries eSIB1 has a frequency span equal to or less than the maximum NR-Light UE supported bandwidth. Alternatively, the PDSCH that carries eSIB1 may have a frequency span wider than the maximum NR-Light UE supported bandwidth. In that case, the NR-Light UE may puncture the RBs of PDSCH outside of its receiving bandwidth. Essentially, the embodiments above about how an NR-Light UE deals with PDCCH that has a wider bandwidth than its maximum supported bandwidth can be applied to address the scenarios where the PDSCH bandwidth is wider than its maximum supported bandwidth.

In yet another embodiment, a first PDCCH intended for legacy UEs or UEs supporting a bandwidth equal to or wider than the CORESET #0 bandwidth is used to schedule eSIB1, and a second PDCCH intended for NR-Light UE. To ensure that the second PDCCH falls within the maximum NR-Light UE supported bandwidth, a different hashing function may be used. For example, the hashing function may be devised as follows:

$$L \cdot \left\{ \left( Y_{p,n_{s,f}^\mu} + \left\lfloor \frac{m_{s,n_{Cl}} \cdot N}{L \cdot M_{s,max}^{(L)}} \right\rfloor + n_{Cl} \right) \bmod \lfloor N/L \rfloor \right\} + i$$

where the number of CCEs in CORESET #0 ($N = N_{CCE,0}$) is used for hashing the first PDCCH intended for legacy UEs or UEs supporting a bandwidth equal to or wider than the CORESET #0 bandwidth, and (N=X), a number of CCEs less than $N_{CCE,0}$, is used for hashing the second PDCCH intended for NR-Light UE. The value of X may be hard coded in the specification. For example, X can be set to the largest number of CCEs that results in a bandwidth size smaller than or equal to the maximum NR-Light UE supported bandwidth. Alternatively, the value of X may be configured by the network or tied to UE capability. The $2^{nd}$ PDCCH intended for NR-Light UE as described above can be used to either schedule an eSIB1 or a new SIB1-L containing only information elements intended for NR-Light UEs.

In yet another embodiment, the legacy UEs or UEs supporting a bandwidth equal to or wider than the CORESET #0 bandwidth determine PDCCH monitoring occasions from searchSpaceZero in pdcch-ConfigSIB1, the NR-Light UEs determine PDCCH monitoring occasions from searchSpaceZeroEnhanced, where searchSpaceZeroEnhanced is an enhanced search space for NR-Light UEs and may include more or different PDCCH monitoring occasions compared to searchSpaceZero. For example, there may be only 1 PDCCH monitoring occasion in searchSpaceZero in a slot where the legacy UEs or UEs supporting a bandwidth equal to or wider than the CORESET #0 bandwidth monitor PDCCH that schedules eSIB1. More than 1 PDCCH monitoring occasions in the slot may be configured in searchSpaceZeroEnhanced for NR-Light UE to compensate for the reduced NR-Light UE bandwidth (applicable for the scheduling of either eSIB or SIB1-L). If the NR-Light UE detects multiple search spaces having PDCCH scrambled with the same RNTI, it can assume these PDCCHs are essentially repeated transmissions in the sense that they carry the same DCI.

Certain embodiments of enable a low-complexity UE to access an NR cell even when the CORESET #0 of the NR cell is configured to a wider bandwidth than the maximum UE supported bandwidth. The disclosure above discusses methods and embodiments for the PDCCH scheduling SIB1, eSIB or SIB1-L, and for the PDSCH transmission carrying SIB1, eSIB or SIB1-L. However, the disclosure can be generalized to all other cases for which a common CORESET is used, e.g., other SI-messages, paging, reception of Msg2 (random access response), Msg4 (in case no NR-Light indication is included in Msg3). Regarding the embodiments on repetitions, non-SI related procedures, e.g., Random Access and paging, could not rely on already occurring periodic repetition but would have to rely on the embodiments with new additional repetitions above.

According to certain embodiments, the same principles described above may also be applicable to the scheduling and reception of other SI messages, a Msg2 (random access response), Msg4 (if 'NR-Light' or lower bandwidth capability is not indicated in Msg3), and paging (using a Paging Indicator-Radio Network Temporary Identifier (PI-RNTI)).

Figure 8:
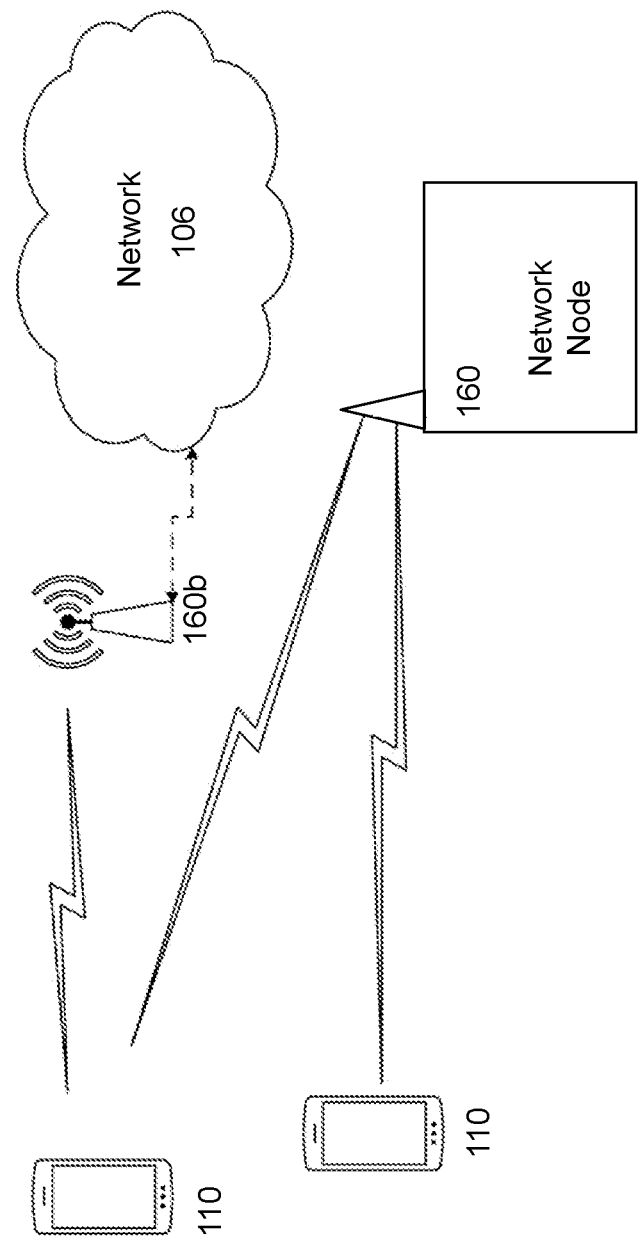
FIG. 8 illustrates an example wireless network, according to certain embodiments.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 106, network nodes 160 and 160b, and wireless devices 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 9:
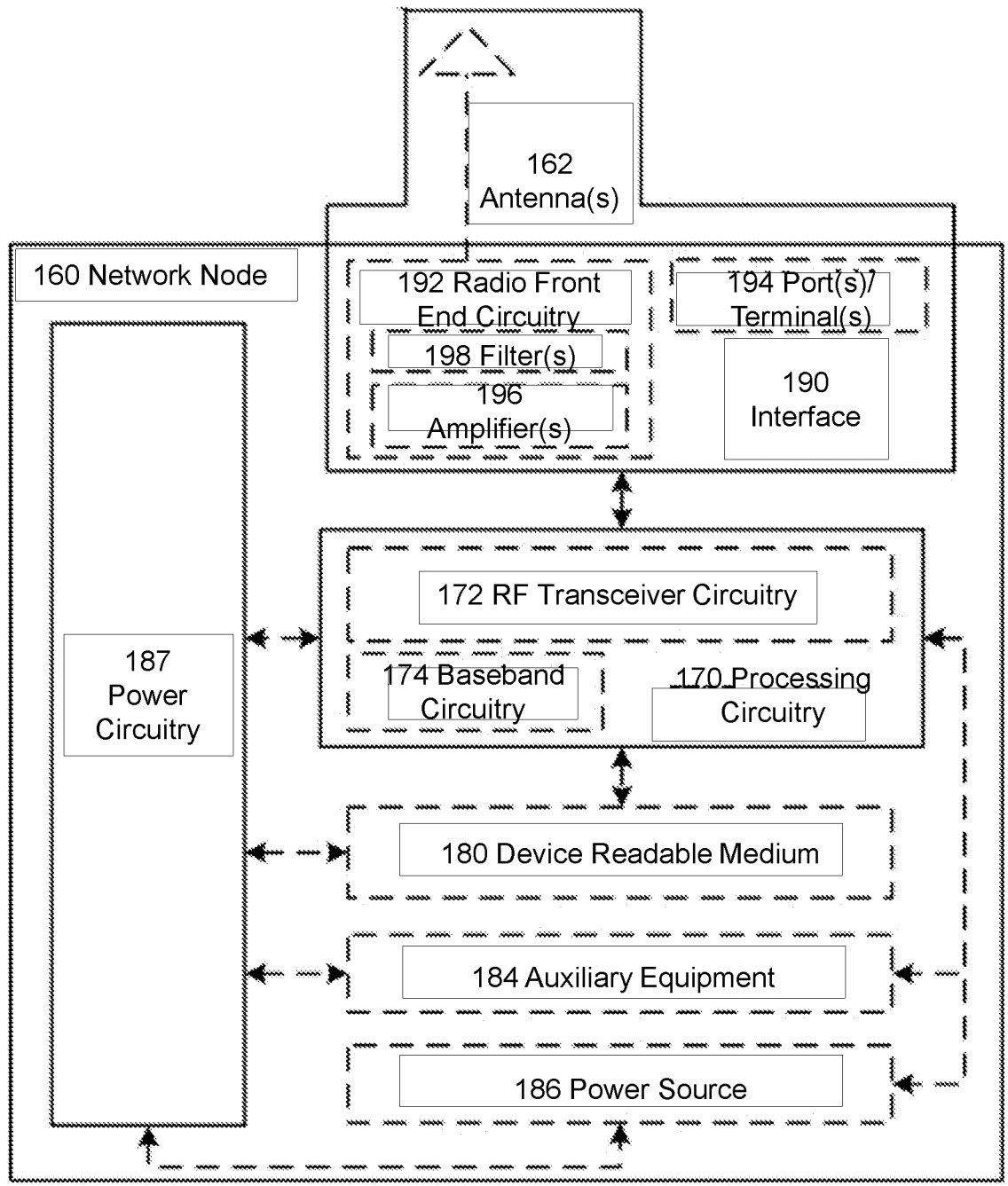
FIG. 9 illustrates an example network node, according to certain embodiments.

FIG. 9 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., Mobile Switching Centres (MSCs), Mobility Management Entities (MMEs)), Operation and Maintenance (O&M) nodes, Operations Support System (OSS) nodes, Self Optimized Network (SON) nodes, positioning nodes (e.g., Evolved-Serving Mobile Location Centres (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 160 includes processing circuitry 170, device readable medium 180, interface 190, auxiliary equipment 184, power source 186, power circuitry 187, and antenna 162. Although network node 160 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, Global System for Mobile Communications (GSM), Wide Code Division Multiplexing Access (WCDMA), Long Term Evolution (LTE), New Radio (NR), WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 9 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 10:
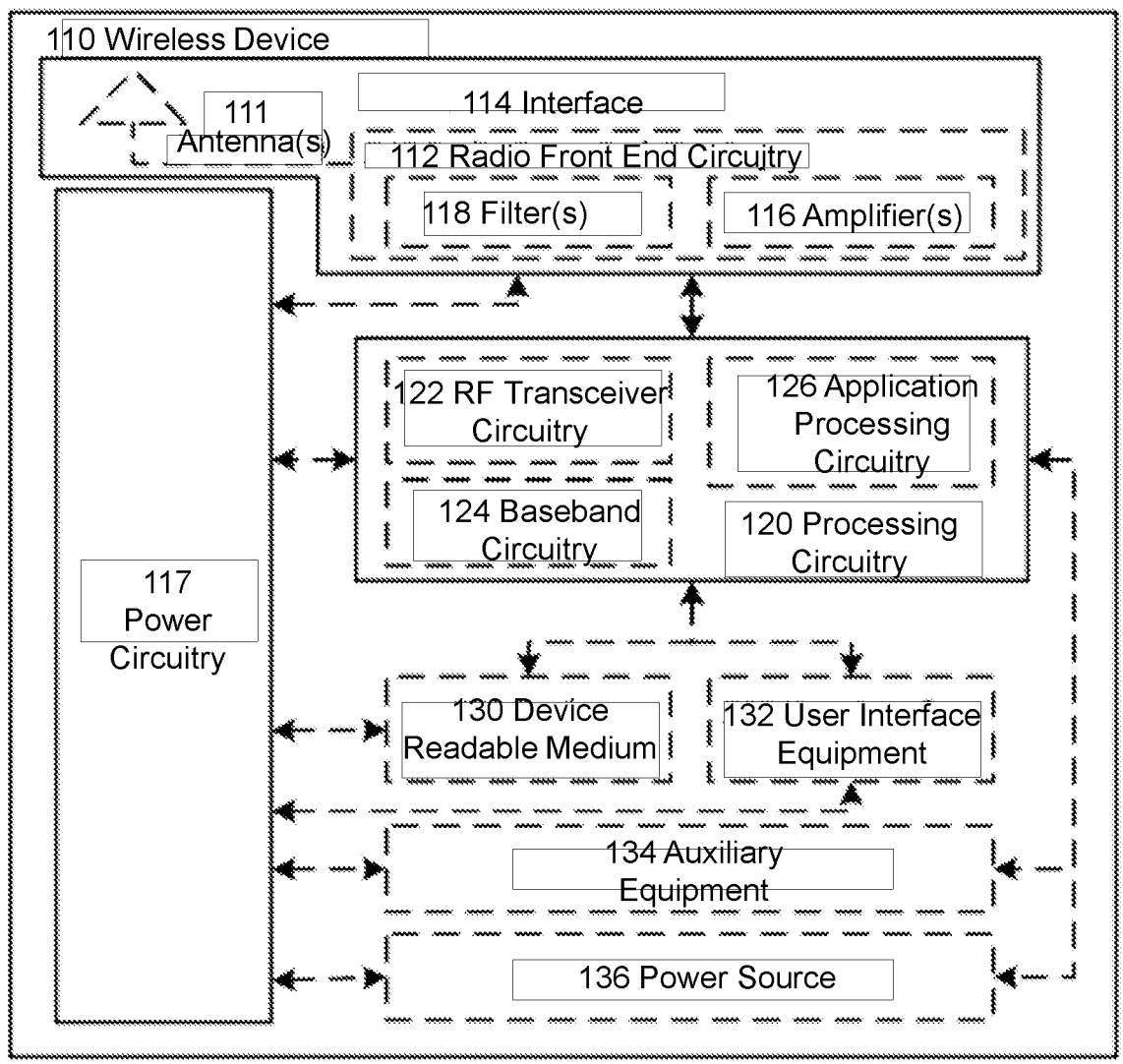
FIG. 10 illustrates an example wireless device, according to certain embodiments.

FIG. 10 illustrates an example wireless device 110, according to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. As other examples, the wireless device may be a NR MTC device or an NR-Light UE implementing the NR MTC or NR-Light standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network, and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. Wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 11:
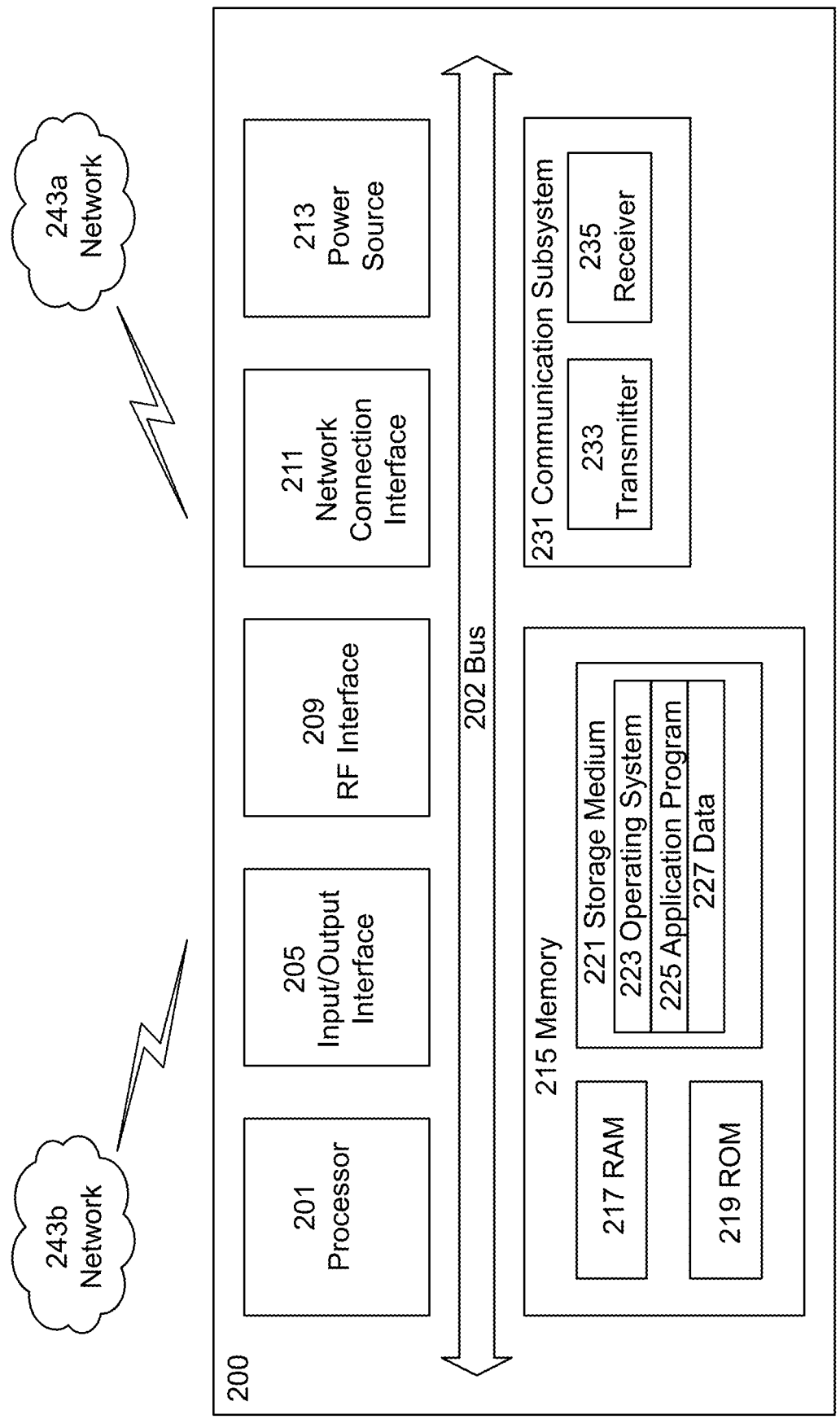
FIG. 11 illustrate an example user equipment, according to certain embodiments.

FIG. 11 illustrates one embodiment of a UE 200 in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3rd Generation Partnership Project (3GPP), including a NB-IoT UE, a machine type communication (MTC) UE, and/or an enhanced MTC (eMTC) UE. UE 200, as illustrated in FIG. 11, is one example of a wireless device configured for communication in accordance with one or more communication standards promulgated by the 3rd Generation Partnership Project (3GPP), such as 3GPP's GSM, UMTS, LTE, and/or 5G standards. As mentioned previously, the term wireless device and UE may be used interchangeable. Accordingly, although FIG. 11 is a UE, the components discussed herein are equally applicable to a wireless device, and vice-versa.

In FIG. 11, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 209 may be configured to provide a communication interface to RF components such as a transmitter, a receiver, and an antenna. Network connection interface 211 may be configured to provide a communication interface to network 243*a*. Network 243*a* may encompass wired: and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 11, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, Universal Terrestrial Radio Access Network (UTRAN), WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 12:
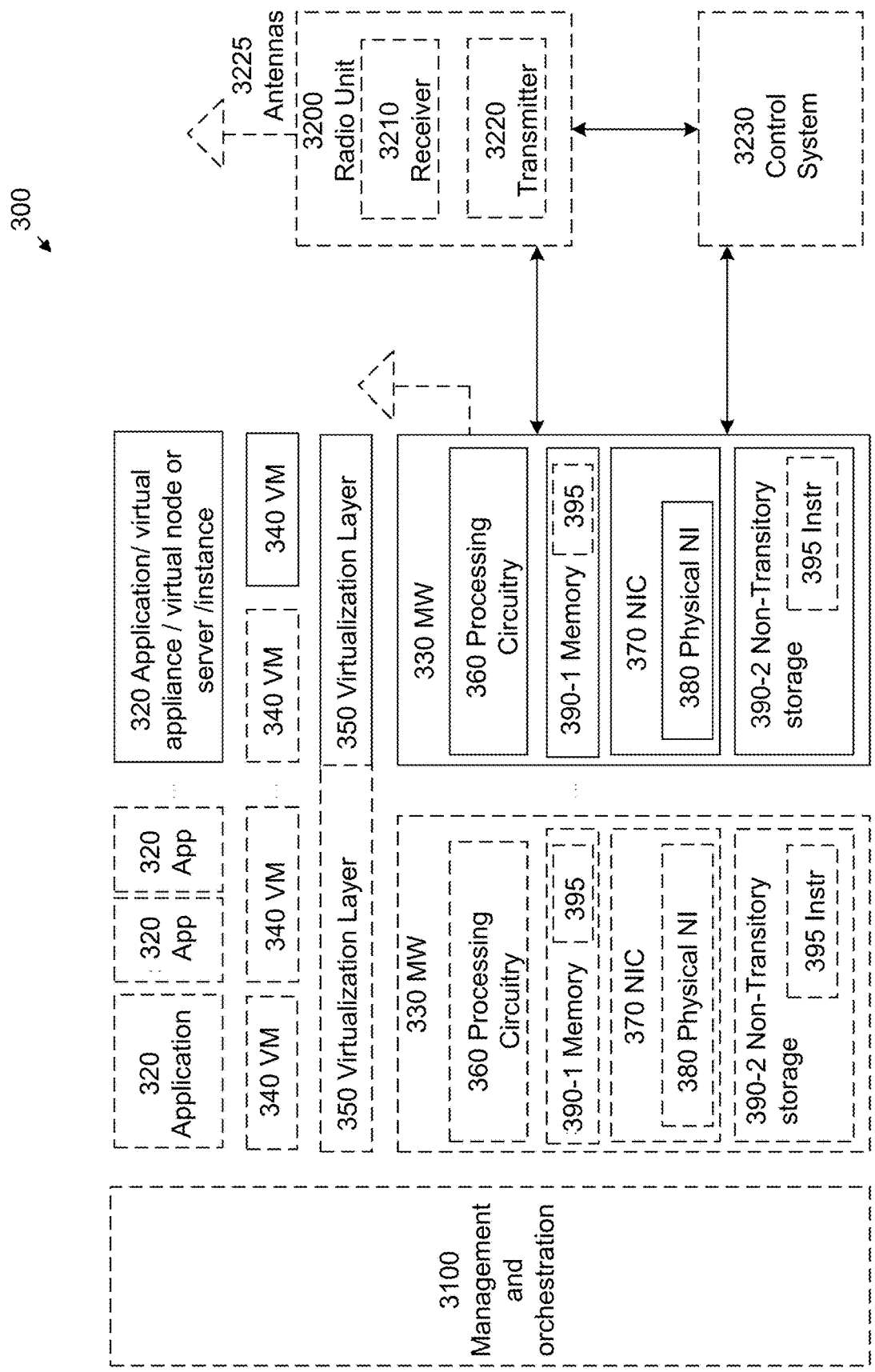
FIG. 12 illustrates a virtualization environment in which functions implemented by some embodiments may be virtualized, according to certain embodiments.

FIG. 12 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 12, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 12.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 13:
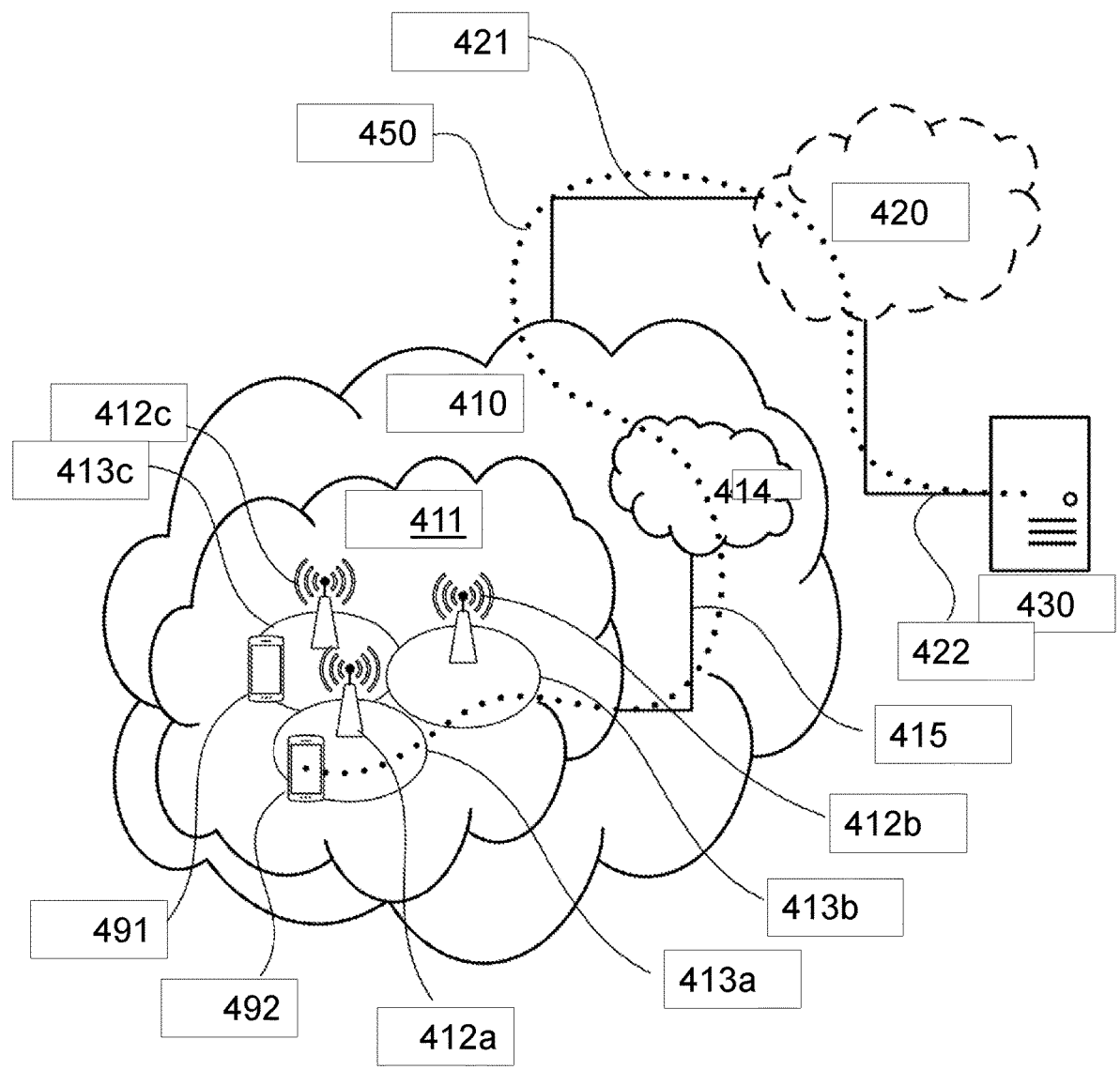
FIG. 13 illustrates a telecommunication network connected via an intermediate network to a host computer, according to certain embodiments.

With reference to FIG. 13, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 13 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 14. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 12) served by base station 520. Communication interface 526 may be configured to facilitate connection 560 to host computer 510. Connection 560 may be direct or it may pass through a core network (not shown in FIG. 12) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 14:
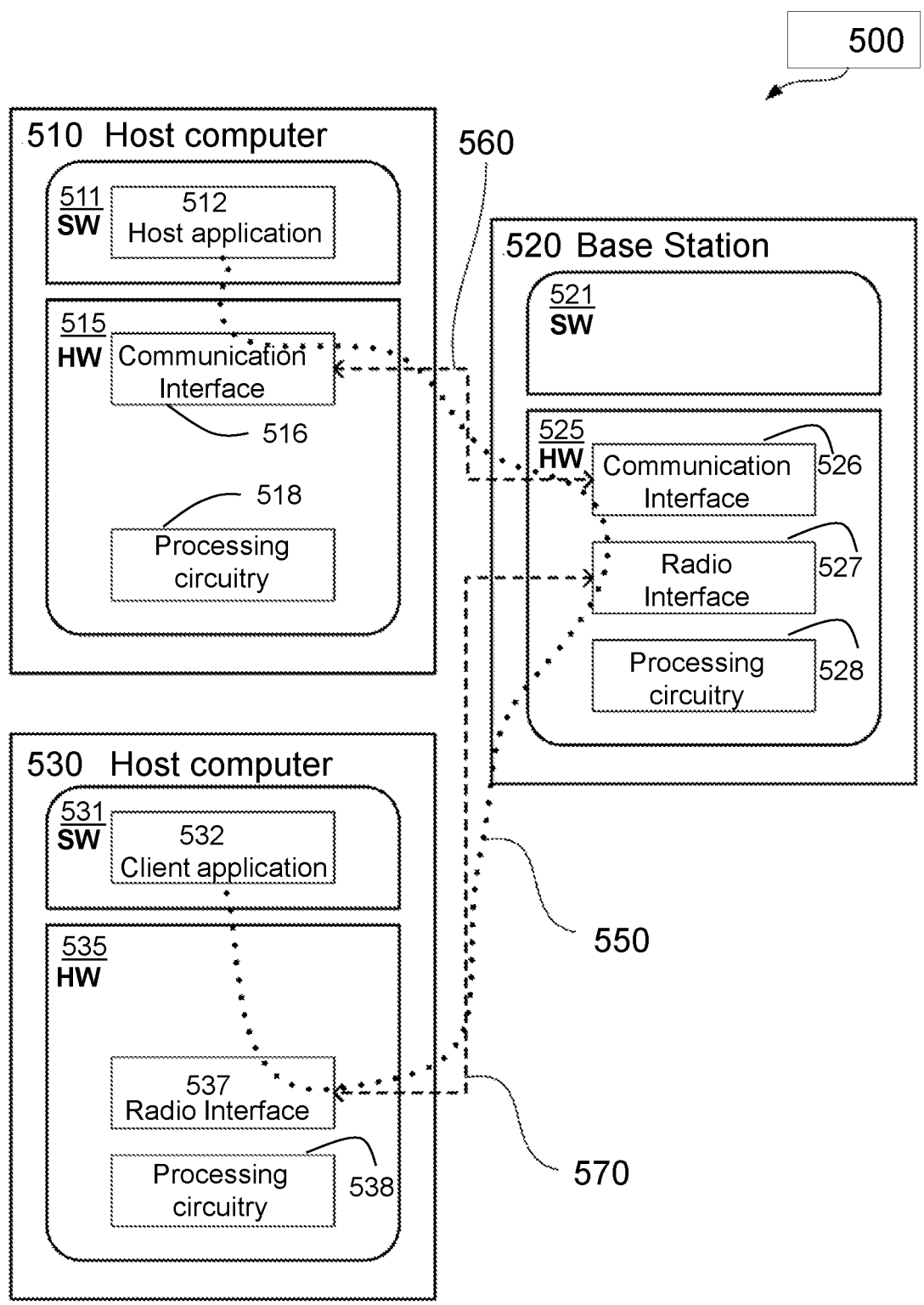
FIG. 14 illustrates a generalized block diagram of a host computer communicating via a base station with a user equipment over a partially wireless connection, according to certain embodiments.

It is noted that host computer 510, base station 520 and UE 530 illustrated in FIG. 14 may be similar or identical to host computer 430, one of base stations 412*a*, 412*b*, 412*c* and one of UEs 491, 492 of FIG. 13, respectively. This is to say, the inner workings of these entities may be as shown in FIG. 14 and independently, the surrounding network topology may be that of FIG. 13.

In FIG. 14, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 15, 16:
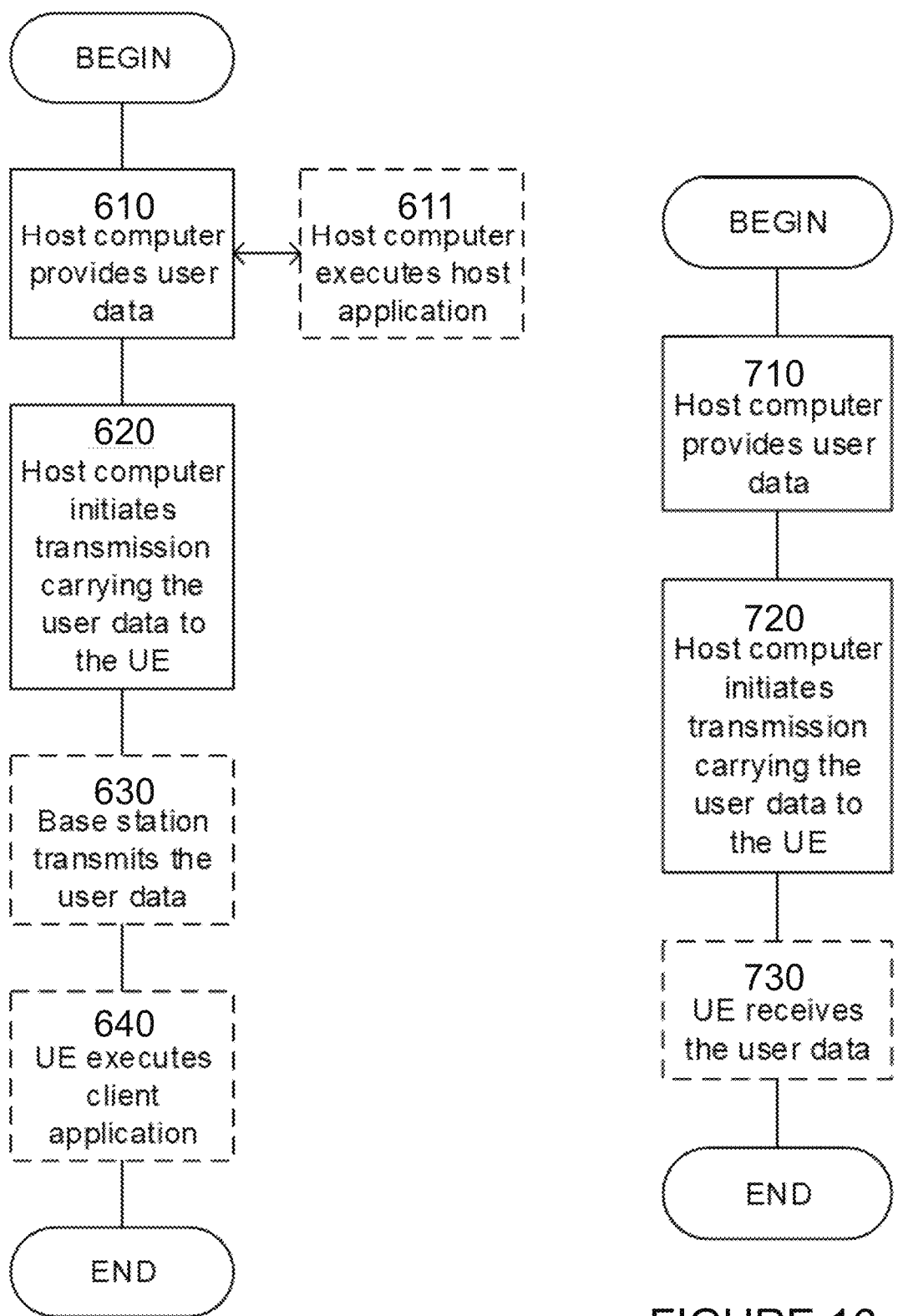
FIG. 15 illustrates a method implemented in a communication system, according to one embodiment.
FIG. 16 illustrates another method implemented in a communication system, according to one embodiment.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 17, 18:
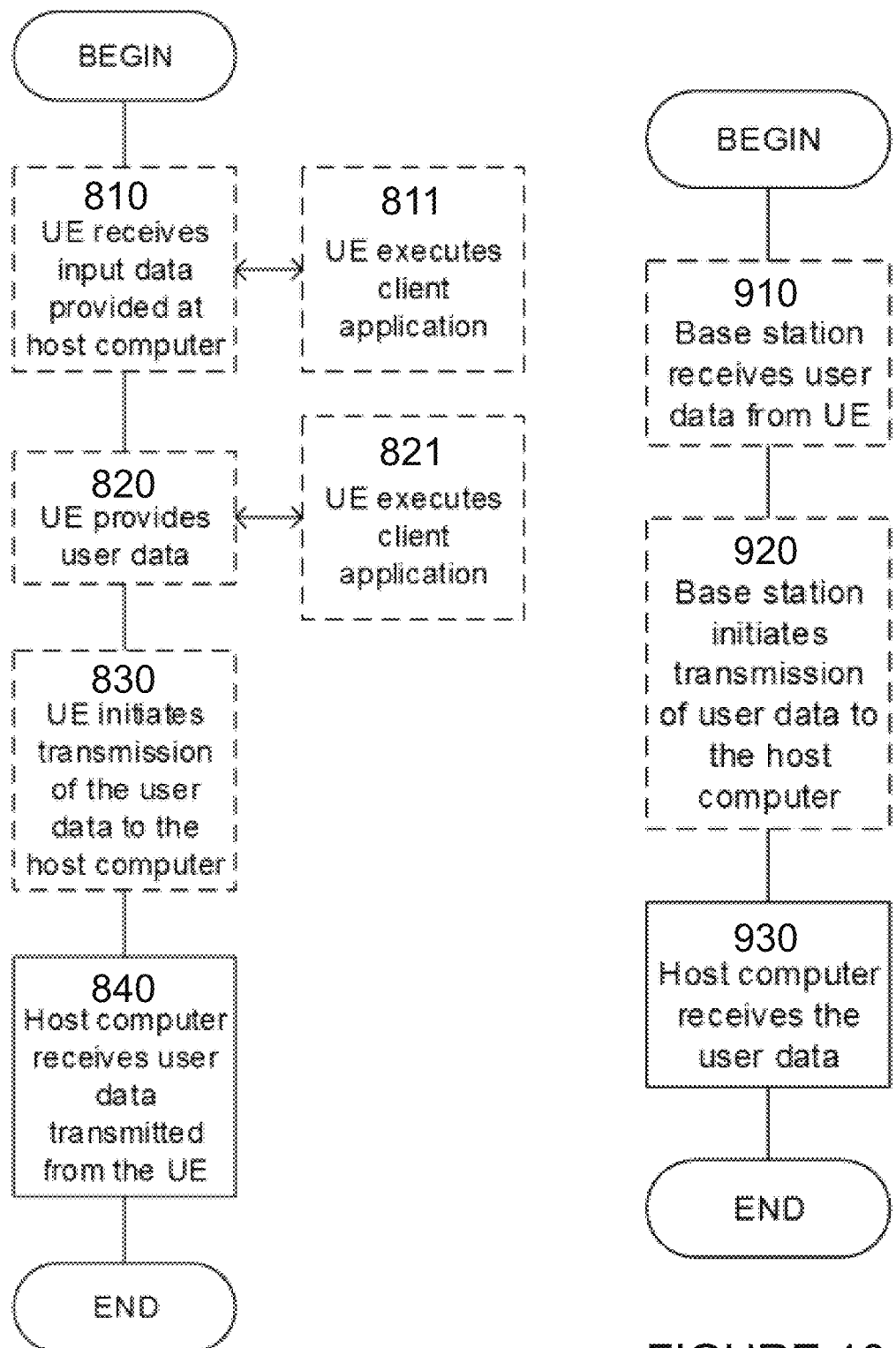
FIG. 17 illustrates another method implemented in a communication system, according to one embodiment.
FIG. 18 illustrates another method implemented in a communication system, according to one embodiment.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 19:
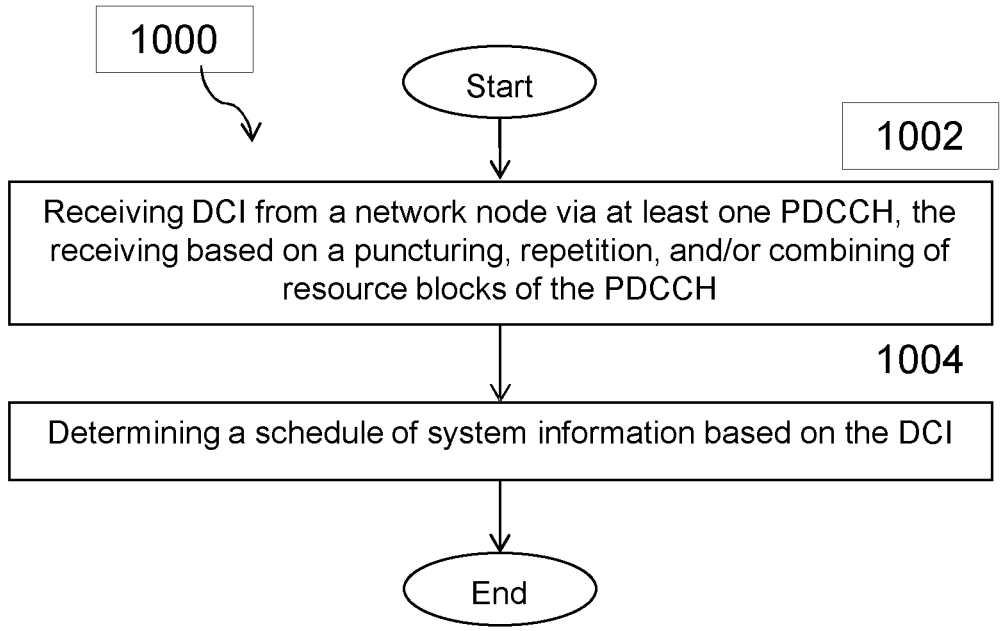
FIG. 19 illustrates an example method by a wireless device, according to certain embodiments.

FIG. 19 depicts a method 1000, according to certain embodiments. The method may be performed by a wireless device, such as wireless device 110 or UE 200 described above. The method begins at step 1002 with receiving DCI from a network node via at least one PDCCH. The receiving is based on a puncturing, repetition, and/or combining of resource blocks of the PDCCH. Examples of puncturing, repetition, and/or combining of resource blocks are further described above with respect to FIGS. 1 through 7. Puncturing, repetition, and/or combining of resource blocks may allow the wireless device to receive the DCI when a bandwidth of a resource set used for the PDCCH is wider than a maximum bandwidth supported by the wireless device. As an example, the wireless device may receive a first portion of the DCI during a first PDCCH and a second portion of the DCI during a second PDCCH. In certain embodiments, the second PDCCH may comprise a repetition of the first PDCCH (or a repetition of a portion of the first PDCCH) that the network node transmits sometime after transmitting the first PDCCH. The method continues to step 1004 with determining scheduling of system information based on the DCI received in step 1002.

Figure 20:
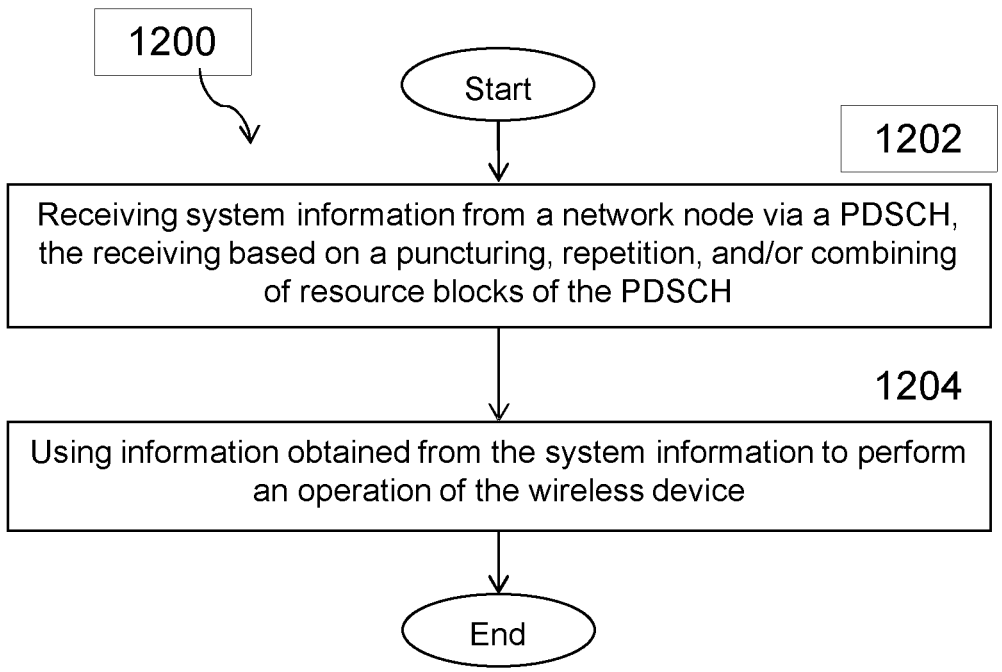
FIG. 20 illustrates another example method by a wireless device, according to certain embodiments.

FIG. 20 depicts another method 1200, according to certain embodiments. The method may be performed by a wireless device, such as wireless device 110 or UE 200 described above. The method begins at step 1202 with receiving system information, such as an eSIB1, from a network node via at least one PDSCH. The receiving is based on a puncturing, repetition, and/or combining of resource blocks of the PDSCH. Examples of puncturing, repetition, and/or combining of resource blocks are further described above with respect to FIGS. 1 through 7. Puncturing, repetition, and/or combining of resource blocks may allow the wireless device to receive the system information when a bandwidth of a resource set used for the PDSCH is wider than a maximum bandwidth supported by the wireless device. As an example, the wireless device may receive a first portion of the system information during a first PDSCH and a second portion of the system information during a second PDSCH. In certain embodiments, the second PDSCH may comprise a repetition of the first PDSCH (or a repetition of a portion of the first PDSCH) that the network node transmits sometime after transmitting the first PDSCH. The method continues to step 1204 with using information obtained from the system information of step 1202 to perform an operation of the wireless device.

Figure 21:
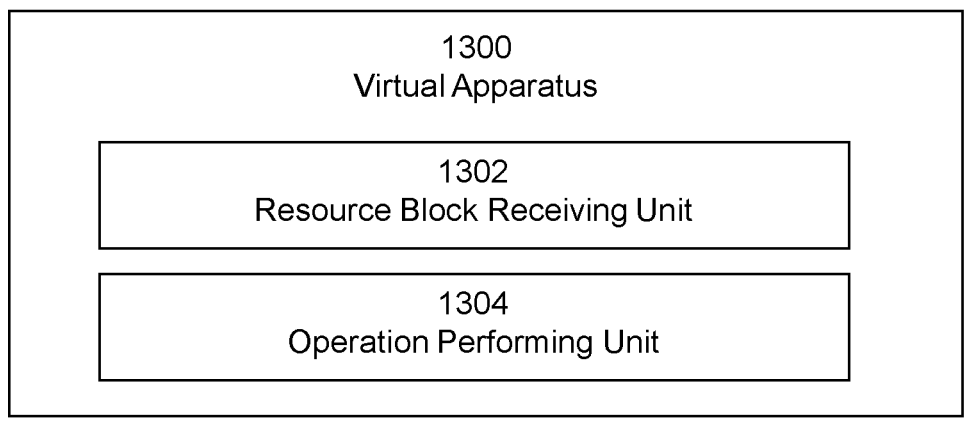
FIG. 21 illustrates an example virtual apparatus, according to certain embodiments.

FIG. 21 illustrates a schematic block diagram of an apparatus 1300 in a wireless network (for example, the wireless network shown in FIG. 8). The apparatus may be implemented in a wireless device (e.g., wireless device 110 shown in FIG. 8 or UE 200 shown in FIG. 11). Apparatus 1300 is operable to carry out the example method described with reference to FIG. 19 and/or FIG. 20 and possibly any other processes or methods disclosed herein. It is also to be understood that the methods of FIG. 19 and/or FIG. 20 are not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause resource block receiving unit 1302, operation performing unit 1304, and any other suitable units of apparatus 1300 to perform corresponding functions according one or more embodiments of the present disclosure.

As illustrated in FIG. 21, apparatus 1300 includes resource block receiving unit 1302 and operation performing unit 1304. Resource block receiving unit 1302 is configured to receive resource blocks based on a puncturing, repetition, and/or combining of resource blocks in order to receive information from a network node when a bandwidth of a resource set used by the network node is wider than a maximum bandwidth supported by the wireless device. For example, resource unit 1302 may receive resource blocks of a PDCCH in order to obtain DCI (e.g., according to the method of FIG. 19) and/or resource unit 1302 may receive resource blocks of a PDSCH in order to obtain system information, such as an eSIB1 (e.g., according to the method of FIG. 20). Operation performing unit 1304 uses the information obtained by the resource block receiving unit 1302 in order to perform one or more operations of the wireless device. For example, operation performing unit 1304 may use DCI obtained from the PDCCH to determine when the network node has scheduled the system information and may then monitor the PDSCH for the system information according to the schedule. As another example, operation performing unit 1304 may use system information obtained from the PDSCH in order to access the network.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

Figure 22:
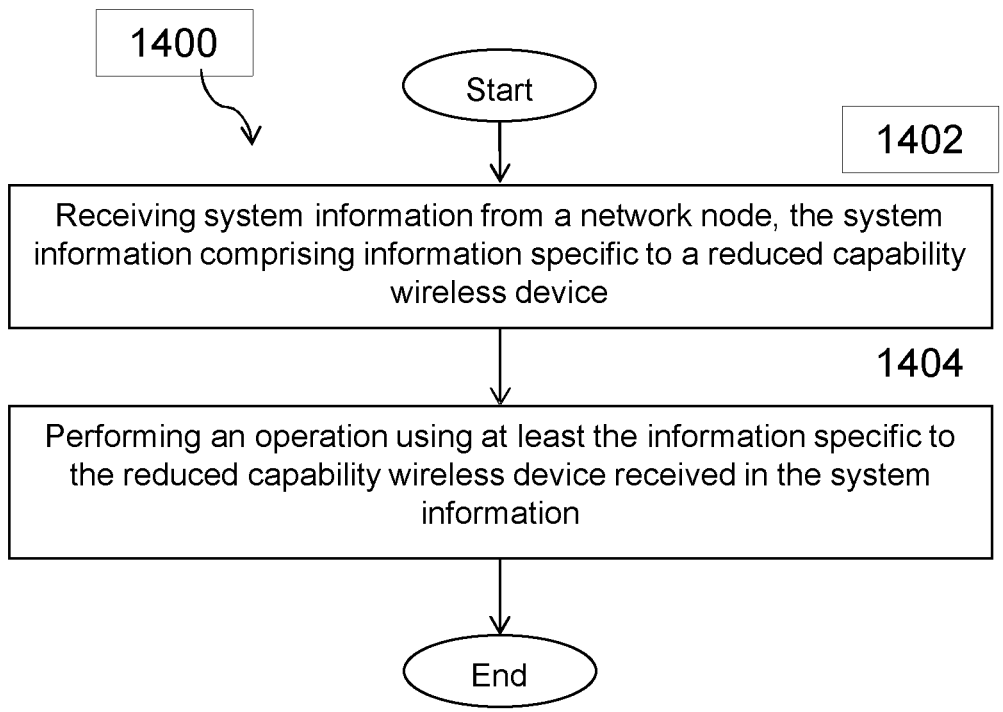
FIG. 22 illustrates another example method by a network node, according to certain embodiments.

FIG. 22 depicts another method 1400 by a wireless device, such as wireless device 110 or UE 200, according to certain embodiments. The method begins at step 1402 when a wireless device 110 that is a reduced capability wireless device receives system information from a network node. The system information includes information specific to the reduced capability wireless device. At step 1404, the wireless device 110 performs an operation using at least the information specific to the reduced capability wireless device received in the system information.

In a particular embodiment, the system information includes one or more legacy information elements and one or more extended information elements. The one or more legacy information elements contain information for a non-reduced capability wireless device, and the one or more extended information elements contain the information specific to the reduced capability wireless device.

In a particular embodiment, the system information comprises a SIB.

In a particular embodiment, the operation of the reduced capability wireless device comprises accessing the network node.

In a particular embodiment, the system information is received via at least a first PDSCH and the receiving is based on at least one of a puncturing, a repetition, and a combining of resource blocks of the first PDSCH.

In a particular embodiment, a bandwidth associated with resources used for the PDSCH is wider than a maximum bandwidth supported by the reduced capability wireless device.

In a particular embodiment, the system information is carried at least in part by the first PDSCH comprising resource blocks (Y). Receiving the system information includes receiving a first subset (X) of resource blocks (Y) using a first bandwidth equal to or less than the maximum bandwidth supported by the reduced capability wireless device. In a further particular embodiment, the wireless device 110 treats a second subset (Z) of resource blocks (Y) as punctured, and the second subset (Z) includes resource blocks other than the first subset of resource blocks (X).

In a further particular embodiment, the second subset (Z) comprises all of the resource blocks (Y) except for the first subset (X) of the resource blocks (Y).

In a further particular embodiment, treating the second subset (Z) of resource blocks (Y) as punctured includes setting values associated with the second subset (Z) of resource blocks (Y) to zero in a decoding process.

In a particular embodiment, the wireless device 110 receives the second subset (Z) of resource blocks (Y) in a second PDSCH using a second bandwidth equal to or less than the maximum bandwidth supported by the reduced capability wireless device.

In a further particular embodiment, at least one of the following is true: the second PDSCH comprises a repetition of the first PDSCH by the network node, the second PDSCH does not comprise a repetition of the first PDSCH by the network node, the second PDSCH sent by the network node comprises only the resource blocks Z that were punctured by the wireless device when receiving the first PDSCH, the first bandwidth is the same as the second bandwidth, the first bandwidth is different than the second bandwidth, the first bandwidth is wider than the second bandwidth, the first bandwidth is narrower than the second bandwidth, values of the second subset (Z) transmitted by the network node are the same in the first PDSCH and the second PDSCH, and values of the second subset (Z) transmitted by the network node are different in the first PDSCH and the second PDSCH.

In a further particular embodiment, the wireless device 110 treats the resource blocks (Y) as punctured during the second PDSCH except for the second subset (Z) of the resource blocks (Y).

In a particular embodiment, the wireless device 110 alternates a puncturing pattern used during different PDSCHs.

In a particular embodiment, the wireless device 110 combines the first subset (X) of resource blocks (Y) obtained when receiving the first PDSCH with the second subset (Z) of resource blocks (Y) and determines the system information based on decoding the combination of the first subset (X) and the second subset (Z) of resource blocks (Y). In a further particular embodiment, the second subset (Z) comprises the resource blocks obtained when receiving the second PDSCH. In a further particular embodiment, the second subset (Z) of resource blocks (Y) received in the second PDSCH comprises punctured resource blocks having the values set to zero in the first PDSCH.

In a particular embodiment, the wireless device 110 receives, via one or more PDCCH transmissions DCI scheduling the system information and determines a scheduling of the system information based on the DCI. The system information is received according to the scheduling received in the DCI, and the DCI is received based on at least one of a puncturing, a repetition, and a combining of resource blocks of the PDCCH.

In a particular embodiment, the wireless device 110 receives, from the network node 160, information indicating a configuration of a resource set and determines whether a bandwidth configured for the resource set is wider than a maximum bandwidth supported by the reduced capability wireless device based on the information indicating the configuration of the resource set. In response to determining that the bandwidth configured for the resource set is wider than the maximum bandwidth supported by the reduced capability wireless device, the wireless device 110 determines the puncturing, repetition, and/or combining of the resource blocks based on the configuration of the resource set. In a further particular embodiment, the resource set comprises control resource set #0 (CORESET #0).

In a particular embodiment, the DCI is received according to a format for scheduling transmission of a downlink data channel, and a CRC value is scrambled by a RNTI specific for the system information. In a further particular embodiment, the downlink data channel is a PDSCH and/or the RNTI specific for the system information is an SI-RNTI.

In a particular embodiment, the DCI is carried at least in part by a first PDCCH comprising resource blocks (Y) and receiving the DCI includes receiving a first subset (X) of resource blocks (Y). The first subset (X) of resource blocks (Y) is received using a first bandwidth equal to or less than a maximum bandwidth supported by the reduced capability wireless device. In a further particular embodiment, the wireless device 110 treats a second subset (Z) of resource blocks (Y) as punctured, the second subset (Z) comprising resource blocks other than the first subset of resource blocks (X). In a further particular embodiment, the second subset (Z) comprises all of the resource blocks (Y) except for the first subset (X) of the resource blocks (Y).

In yet another particular embodiment, treating the second subset (Z) of resource blocks (Y) as punctured comprises setting values associated with the second subset (Z) of resource blocks (Y) to zero in a decoding process.

In a further particular embodiment, the wireless device 110 receives the second subset (Z) of resource blocks (Y) in a second PDCCH. The second subset (Z) of resource blocks (Y) is received using a second bandwidth equal to or less than the maximum bandwidth supported by the reduced capability wireless device.

In a particular embodiment, at least one of the following is true: the second PDCCH comprises a repetition of the first PDCCH by the network node, the second PDCCH does not comprise a repetition of the first PDCCH by the network node, the second PDCCH sent by the network node comprises only the resource blocks Z that were punctured by the wireless device when receiving the first PDCCH, the first bandwidth is the same as the second bandwidth, the first bandwidth is different than the second bandwidth, the first bandwidth is wider than the second bandwidth, the first bandwidth is narrower than the second bandwidth, values of the second subset (Z) transmitted by the network node are the same in the first PDCCH and the second PDCCH, and values of the second subset (Z) transmitted by the network node are different in the first PDCCH and the second PDCCH.

In a further particular embodiment, the wireless device 110 treats the resource blocks (Y) as punctured during the second PDCCH except for the second subset (Z) of the resource blocks (Y).

In a particular embodiment, the wireless device 110 alternates a puncturing pattern used during different PDCCHs.

In a particular embodiment, the wireless device 110 combines the first subset (X) of resource blocks (Y) obtained when receiving the first PDCCH with the second subset (Z) of resource blocks (Y) and determines the DCI based on decoding the combination of the first subset (X) and the second subset (Z) of resource blocks (Y).

In a particular embodiment, the second subset (Z) comprises the resource blocks obtained when receiving the second PDCCH or the second subset (Z) of resource blocks (Y) received in the second PDSCH comprises punctured resource blocks having the values set to zero in the first PDSCH.

Figure 23:
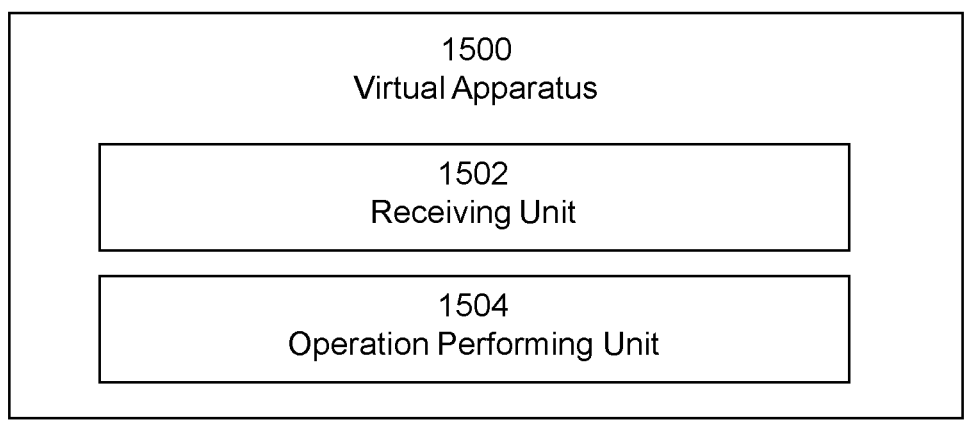
FIG. 23 illustrates another example virtual apparatus, according to certain embodiments.

FIG. 23 illustrates another virtual apparatus 1500 in a wireless network (for example, the wireless network shown in FIG. 8). The apparatus may be implemented in a wireless device (e.g., wireless device 110 shown in FIG. 8 or UE 200 shown in FIG. 11). Apparatus 1500 is operable to carry out the example method described with reference to FIG. 22 and possibly any other processes or methods disclosed herein. It is also to be understood that the method of FIG. 22 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1502, operation performing unit 1504, and any other suitable units of apparatus 1500 to perform corresponding functions according one or more embodiments of the present disclosure.

As illustrated in FIG. 23, virtual apparatus 1500 includes receiving unit 1502 and operation performing unit 1504. According to certain embodiments, receiving unit 1502 is configured to perform certain of the receiving operations of virtual apparatus 1500. For example, in a particular embodiment, receiving unit 1502 may be configured to receive system information from a network node. The system information includes information specific to the reduced capability wireless device.

According to certain embodiments, operation performing unit 1504 is configured to perform certain of the performing operations of virtual apparatus 1500. For example, in a particular embodiment, operation performing unit 1504 may be configured to perform an operation using at least the information specific to the reduced capability wireless device received in the system information.

Figure 24:
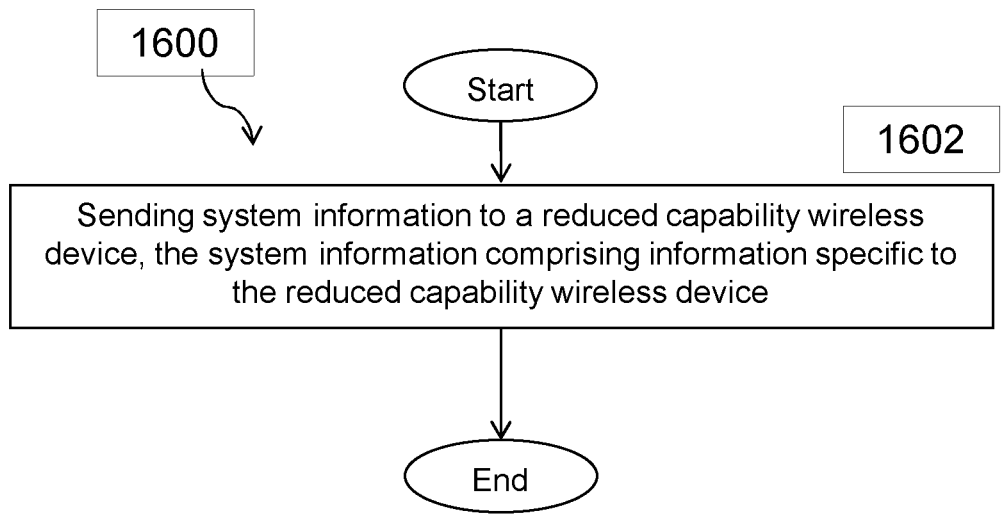
FIG. 24 illustrates an example method by a network node, according to certain embodiments.

FIG. 24 depicts a method 1600 by a network node, such as network node 160, according to certain embodiments. The method begins at step 1602 when network node 160 sends system information to a wireless device 110, the system information comprising information specific to a reduced capability wireless device.

In a particular embodiment, the system information comprises one or more legacy information elements and one or more extended information elements. The one or more legacy information elements contain information for a non-reduced capability wireless device, and the one or more extended information elements containing the information specific to the reduced capability wireless device.

In a particular embodiment, the system information comprises a system information block, SIB.

In a particular embodiment, the network node 160 determines the information specific to the reduced capability wireless device based on a structure of at least one of the system information and DCI scheduling the system information.

In a particular embodiment, the network node 160 send DCI that schedules the system information. The DCI is sent according to a format for scheduling transmission of a downlink data channel. A CRC value is scrambled by a RNTI specific for the system information. In a further particular embodiment, the downlink data channel is a physical downlink shared channel, PDSCH.

In a further particular embodiment, the format for scheduling the transmission of the downlink data channel is a DCI format 1_0.

In a further particular embodiment, the DCI is carried via at least one physical downlink control channel, PDCCH, and the network node 160 determines a configuration for one or more transmissions of the PDCCH based on a puncturing pattern of the reduced capability wireless device 110 for which a resource set for the PDCCH has a bandwidth wider than a maximum bandwidth supported by the reduced capability wireless device 110. The network node 160 transmits the one or more transmissions of the PDCCH based on the determined configuration. In a further particular embodiment, the resource set corresponds to control resource set #0 (CORESET #0).

In a particular embodiment, the system information is carried on a PDSCH and the network node 160 determines a configuration for one or more transmissions of the PDSCH carrying the system information. The one or more transmissions are determined based on a puncturing pattern of the reduced capability wireless device for which a bandwidth for transmitting the PDSCH is wider than a maximum bandwidth supported by the reduced capability wireless device. The network node 160 transmits the one or more transmissions of the PDSCH based on the determined configuration.

Figure 25:
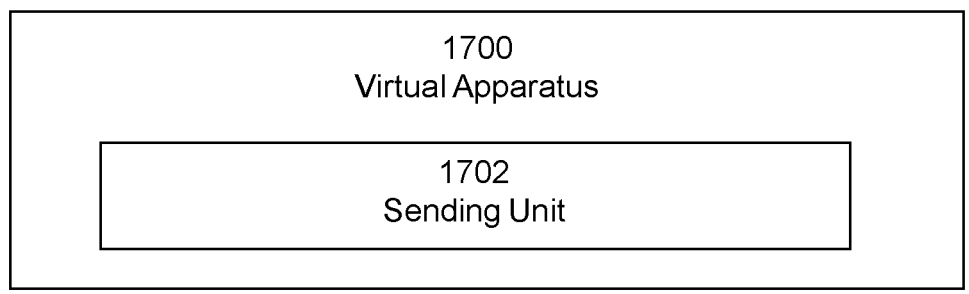
FIG. 25 illustrates another example virtual apparatus, according to certain embodiments.

FIG. 25 illustrates another virtual apparatus 1700 in a wireless network (for example, the wireless network shown in FIG. 8). The apparatus may be implemented in a network node (e.g., network node 160 shown in FIG. 8). Apparatus 1700 is operable to carry out the example method described with reference to FIG. 24 and possibly any other processes or methods disclosed herein. It is also to be understood that the method of FIG. 24 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause sending unit 1702 and any other suitable units of apparatus 1700 to perform corresponding functions according one or more embodiments of the present disclosure.

As illustrated in FIG. 25, virtual apparatus 1700 includes sending unit 1702. According to certain embodiments, sending unit 1702 is configured to perform certain of the sending operations of virtual apparatus 1700. For example, in a particular embodiment, sending unit 1702 may be configured to send system information to a wireless device 110, the system information comprising information specific to a reduced capability wireless device.

Example Embodiments

The following are example embodiments of the present disclosure. In the examples, cross-references to a particular embodiment (such as embodiment 1) may refer to that embodiment (e.g., embodiment 1) and/or any of its sub-embodiment(s) (e.g., embodiment 1a, 1b, and/or 1c).

Example Embodiment 1. A method performed by a wireless device, the method comprising: receiving system information from a network node, the system information comprising information specific to a reduced capability wireless device; and performing an operation of the wireless device using at least the information specific to the reduced capability wireless device received in the system information.

Example Embodiment 1a. The method of embodiment 1, wherein the system information comprises a system information block (SIB).

Example Embodiment 1b. The method of embodiment 1a, wherein the SIB is a SIB1, an eSIB1, a SIBX, or a SIBX-L.

Example Embodiment 1c. The method of embodiment 1, wherein the system information comprises a system information block that includes legacy information elements and extended information elements, the legacy information elements comprising system information according to 3GPP release 16 or earlier, the extended information elements containing the information specific to the reduced capability wireless device.

Example Embodiment 2. The method of embodiment 1, wherein the system information block is received according to any of Example Embodiments 17-25. Example Embodiment 3. The method of any of Example Embodiments 1-2, wherein the operation of the wireless device comprises accessing the network node.

Example Embodiment 4. The method of any of Example Embodiments 1-3, further comprising: receiving downlink control information (DCI) scheduling the system information; wherein the receiving of the system information is performed according to the scheduling received in the DCI.

Example Embodiment 5. The method of embodiment 4, wherein the DCI is received via one or more physical downlink control channel (PDCCH) transmissions, the one or more PDCCH transmissions received according to any of embodiments 7-16. In certain embodiments, reference to different PDCCHs or PDCCH transmissions may describe the PDCCHs or PDCCH transmissions from the perspective of the network node. There may be a case where a network node transmits different PDCCHs or PDCCH transmissions (e.g., one compatible with legacy UEs and another containing information for NR-Light UEs). There may be a case where a network node transmits repetitions of the same PDCCH or PDCCH transmission (e.g., an NR-Light UE may alternate puncturing in order to obtain certain information from a first transmission of the PDCCH and other information from a repetition of the PDCCH).

Example Embodiment 6. The method of any of embodiments 4-5, wherein the DCI is received according to a format for scheduling transmission of a downlink data channel, wherein a cyclic redundancy check (CRC) value is scrambled by a Radio Network Temporary Identifier (RNTI) specific for the system information.

Example Embodiment 6a. The method of embodiment 6, wherein the downlink data channel is a physical downlink shared channel (PDSCH).

Example Embodiment 6b. The method of embodiment 6, wherein the format for scheduling the transmission of the downlink data channel is a DCI format 1_0.

Example Embodiment 6c. The method of embodiment 6, wherein the RNTI specific for the system information is an SI-RNTI.

Example Embodiment 7. A method in a wireless device, the method comprising: receiving downlink control information (DCI) from a network node, the DCI received via at least one physical downlink control channel (PDCCH), the receiving based on a puncturing, repetition, and/or combining of resource blocks of the PDCCH; and determining a scheduling of system information based on the DCI.

Example Embodiment 7a. The method of embodiment 7, wherein a bandwidth of a resource set used for the PDCCH is wider than a maximum bandwidth supported by the wireless device.

Example Embodiment 7b. The method of embodiment 7, wherein the resource set comprises control resource set #0 (CORESET #0).

Example Embodiment 8. The method of embodiment 7, further comprising: receiving the system information according to the scheduling determined from the DCI; and accessing the network node using information obtained from the system information.

Example Embodiment 9. The method of any of embodiments 7-8, further comprising: receiving, from the network node, information indicating the configuration of the resource set; determining whether the bandwidth configured for the resource set is wider than the maximum bandwidth supported by the wireless device based on the received information indicating the configuration of the resource set; and in response to determining that the bandwidth configured for the resource set is wider than the maximum bandwidth supported by the wireless device, determining the puncturing, repetition, and/or combining of the resource blocks based on the configuration of the resource set.

Example Embodiment 10. The method of any of embodiments 7-9, wherein the DCI is carried at least in part by a first PDCCH comprising resource blocks (Y) and receiving the DCI comprises: receiving a first subset (X) of resource blocks (Y), the first subset (X) of resource blocks (Y) received using a first bandwidth equal to or less than the maximum bandwidth supported by the wireless device.

Example Embodiment 11. The method of embodiment 10, further comprising: treating a second subset (Z) of resource blocks (Y) as punctured, the second subset (Z) comprising resource blocks other than the first subset of resource blocks (X).

Example Embodiment 11a. The method of embodiment 11, wherein the second subset (Z) comprises all of the resource blocks (Y) except for the first subset (X) of the resource blocks (Y). This may be represented by the expression $Z=(Y-X)$, where $(Y-X)$ is the set of resource blocks Y with elements in the subset of X removed.

Example Embodiment 12. The method of embodiment 11, wherein treating the second subset (Z) of resource blocks (Y) as punctured comprises setting values associated with the second subset (Z) of resource blocks (Y) to zero in a decoding process.

Example Embodiment 13. The method of any of embodiments 10-12, further comprising: receiving the second subset (Z) of resource blocks (Y) in a second PDCCH, the second subset (Z) of resource blocks (Y) received using a second bandwidth equal to or less than the maximum bandwidth supported by the wireless device.

Example Embodiment 13a. The method of embodiment 13, wherein the second PDCCH comprises a repetition of the first PDCCH by the network node.

Example Embodiment 13b. The method of embodiment 13, wherein the second PDCCH does not comprise a repetition of the first PDCCH by the network node.

Example Embodiment 13c. The method of embodiment 13, wherein the second PDCCH sent by the network node comprises only the resource blocks Z that were punctured by the wireless device when receiving the first PDCCH.

Example Embodiment 13d. The method of embodiment 13, wherein the first bandwidth is the same as the second bandwidth.

Example Embodiment 13e. The method of embodiment 13, wherein the first bandwidth is different than the second bandwidth.

Example Embodiment 13f. The method of embodiment 13, wherein the first bandwidth is wider than the second bandwidth.

Example Embodiment 13g. The method of embodiment 13, wherein the first bandwidth is narrower than the second bandwidth.

Example Embodiment 13h. The method of embodiment 13, wherein values of the second subset (Z) transmitted by the network node are the same in the first PDCCH and the second PDCCH.

Example Embodiment 13i. The method of embodiment 13, wherein values of the second subset (Z) transmitted by the network node are different in the first PDCCH and the second PDCCH.

Example Embodiment 14. The method of embodiment 13, further comprising: treating the resource blocks (Y) as punctured during the second PDCCH except for the second subset (Z) of the resource blocks (Y).

Example Embodiment 15. The method of any of embodiments 7-14, further comprising: alternating a puncturing pattern used during different PDCCHs.

Example Embodiment 16. The method of any of embodiments 13-15, further comprising: combining the first subset (X) of resource blocks (Y) obtained when receiving the first PDCCH with the second subset (Z) of resource blocks (Y); and determining the DCI based on decoding the combination of the first subset (X) and the second subset (Z) of resource blocks (Y).

Example Embodiment 16a. The method of embodiment 16, wherein the second subset (Z) comprises the resource blocks obtained when receiving the second PDCCH.

Example Embodiment 16b. The method of embodiment 16, wherein the second subset (Z) comprises the punctured resource blocks having the values set to zero.

Example Embodiment 17. A method in a wireless device, the method comprising: receiving system information from a network node via a physical downlink shared channel (PDSCH), the receiving based on a puncturing, repetition, and/or combining of resource blocks of the PDSCH; and using information obtained from the system information to perform an operation of the wireless device.

Example Embodiment 17a. The method of embodiment 17, wherein a bandwidth associated with resources used for the PDSCH is wider than a maximum bandwidth supported by the wireless device.

Example Embodiment 18. The method of embodiment 17, wherein the operation of the wireless device comprises accessing the network node.

Example Embodiment 19. The method of any of embodiments 17-18, wherein the system information is carried at least in part by a first PDSCH comprising resource blocks (Y) and receiving the system information comprises: receiving a first subset (X) of resource blocks (Y), the first subset (X) of resource blocks (Y) received using a first bandwidth equal to or less than the maximum bandwidth supported by the wireless device.

Example Embodiment 20. The method of embodiment 19, further comprising: treating a second subset (Z) of resource blocks (Y) as punctured, the second subset (Z) comprising resource blocks other than the first subset of resource blocks (X).

Example Embodiment 20a. The method of embodiment 20, wherein the second subset (Z) comprises all of the resource blocks (Y) except for the first subset (X) of the resource blocks (Y).

Example Embodiment 21. The method of embodiment 20, wherein treating the second subset (Z) of resource blocks (Y) as punctured comprises setting values associated with the second subset (Z) of resource blocks (Y) to zero in a decoding process.

Example Embodiment 22. The method of any of embodiments 19-21, further comprising: receiving the second subset (Z) of resource blocks (Y) during in a second PDSCH, the second subset (Z) of resource blocks (Y) received using a second bandwidth equal to or less than the maximum bandwidth supported by the wireless device.

Example Embodiment 22a. The method of embodiment 22, wherein the second PDSCH comprises a repetition of the first PDSCH by the network node.

Example Embodiment 22b. The method of embodiment 22, wherein the second PDSCH does not comprise a repetition of the first PDSCH by the network node.

Example Embodiment 22c. The method of embodiment 22, wherein the second PDSCH sent by the network node comprises only the resource blocks Z that were punctured by the wireless device when receiving the first PDSCH.

Example Embodiment 22d. The method of embodiment 22, wherein the first bandwidth is the same as the second bandwidth.

Example Embodiment 22e. The method of embodiment 22, wherein the first bandwidth is different than the second bandwidth.

Example Embodiment 22f. The method of embodiment 22, wherein the first bandwidth is wider than the second bandwidth.

Example Embodiment 22g. The method of embodiment 22, wherein the first bandwidth is narrower than the second bandwidth.

Example Embodiment 22 h. The method of embodiment 22, wherein values of the second subset (Z) transmitted by the network node are the same in the first PDSCH and the second PDSCH.

Example Embodiment 22i. The method of embodiment 22, wherein values of the second subset (Z) transmitted by the network node are different in the first PDSCH and the second PDSCH.

Example Embodiment 23. The method of embodiment 22, further comprising: treating the resource blocks (Y) as punctured during the second PDSCH except for the second subset (Z) of the resource blocks (Y).

Example Embodiment 24. The method of any of embodiments 17-23, further comprising: alternating a puncturing pattern used during different PDSCHs.

Example Embodiment 25. The method of any of embodiments 22-24, further comprising: combining the first subset (X) of resource blocks (Y) obtained when receiving the first PDSCH with the second subset (Z) of resource blocks (Y); and determining the system information based on decoding the combination of the first subset (X) and the second subset (Z) of resource blocks (Y).

Example Embodiment 25a. The method of embodiment 25, wherein the second subset (Z) comprises the resource blocks obtained when receiving the second PDSCH.

Example Embodiment 25b. The method of embodiment 25, wherein the second subset (Z) comprises the punctured resource blocks having the values set to zero.

Example Embodiment 26. The method of any of the previous embodiments, further comprising: providing user data; and forwarding the user data to a host computer via the transmission to the base station.

Example Embodiment 27. A method performed by a base station, the method comprising: configuring a resource set for transmitting downlink control information (DCI) used for scheduling system information for a first type of wireless device, the resource set configured using more symbols than a number of symbols required for a particular aggregation level so that a number of resource blocks within a maximum supported bandwidth of a second type of wireless device is increased.

Example Embodiment 27a. The method of embodiment 27a, wherein the resource set is a control resource set #0 (CORESET #0).

Example Embodiment 28. A method performed by a base station, the method comprising: sending system information to a wireless device, the system information comprising information specific to a reduced capability wireless device.

Example Embodiment 28a. The method of embodiment 28, wherein the system information comprises a system information block (SIB).

Example Embodiment 28b. The method of embodiment 28a, wherein the SIB is a SIB1, an eSIB1, a SIBX, or a SIBX-L.

Example Embodiment 28c. The method of embodiment 28, wherein the system information comprises a system information block that includes legacy information elements and extended information elements, the legacy information elements comprising system information according to 3GPP release 16 or earlier, the extended information elements containing the information specific to the reduced capability wireless device.

Example Embodiment 29. The method of embodiment 28, further comprising: determining the information specific to the reduced capability wireless device based on a structure of the system information and/or downlink control information (DCI) scheduling the system information.

Example Embodiment 30. The method of any of embodiments 28-29, further comprising: sending downlink control information (DCI) scheduling the system information, the DCI sent according to a format for scheduling transmission of a downlink data channel, wherein a cyclic redundancy check (CRC) value is scrambled by a Radio Network Temporary Identifier (RNTI) specific for the system information.

Example Embodiment 30a. The method of embodiment 30, wherein the downlink data channel is a physical downlink shared channel (PDSCH).

Example Embodiment 30b. The method of embodiment 30, wherein the format for scheduling the transmission of the downlink data channel is a DCI format 1_0.

Example Embodiment 31. A method performed by a base station, the method comprising: determining a configuration for one or more transmissions and/or repetitions of at least one physical downlink control channel (PDCCH) carrying downlink control information (DCI), the one or more transmissions and/or repetitions determined based on a puncturing pattern of a wireless device for which a resource set for the PDCCH has a bandwidth wider than a maximum bandwidth supported by the wireless device; and transmitting the one or more transmissions and/or repetitions of the PDCCH based on the determined configuration.

Example Embodiment 31a. The method of embodiment 31, wherein the resource set corresponds to control resource set #0 (CORESET #0).

Example Embodiment 32. A method performed by a base station, the method comprising: determining a configuration for one or more transmissions and/or repetitions of a physical downlink shared channel (PDSCH) carrying system information, the one or more transmissions and/or repetitions determined based on a puncturing pattern of a wireless device for which a bandwidth for transmitting the PDSCH is wider than a maximum bandwidth supported by the wireless device; and transmitting the one or more transmissions and/or repetitions of the PDSCH based on the determined configuration.

Example Embodiment 32a. The method of embodiment 32, wherein the system information comprises a system information block (SIB).

Example Embodiment 32b. The method of embodiment 32a, wherein the SIB is a SIB1, an eSIB1, a SIBX, or a SIBX-L.

Example Embodiment 32c. The method of embodiment 32, wherein the system information comprises a system information block that includes legacy information elements and extended information elements, the legacy information elements comprising system information according to 3GPP release 16 or earlier, the extended information elements containing information specific to a reduced capability wireless device.

Example Embodiment 33. The method of any of the previous embodiments, further comprising: obtaining user data; and forwarding the user data to a host computer or a wireless device.

Example Embodiment 34. A wireless device, the wireless device comprising: processing circuitry configured to perform any one or more of the steps of Example Embodiments 1 to 26; and power supply circuitry configured to supply power to the wireless device.

Example Embodiment 35. A base station, the base station comprising: processing circuitry configured to perform any one or more of the steps Example Embodiments 27 to 33; power supply circuitry configured to supply power to the base station.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order. Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method by a reduced capability wireless device, the method comprising:
receiving system information from a network node, the system information comprising information specific to the reduced capability wireless device; wherein:
the system information is carried at least in part by a first physical downlink shared channel, PDSCH, comprising resource blocks (Y), and
receiving the system information comprises receiving a first subset (X) of resource blocks (Y), the first subset (X) of resource blocks (Y) received using a first bandwidth equal to or less than the maximum bandwidth supported by the reduced capability wireless device;
treating a second subset (Z) of resource blocks (Y) as punctured, the second subset (Z) comprising resource blocks other than the first subset of resource blocks (X), wherein the second subset (Z) comprises all of the resource blocks (Y) except for the first subset (X) of the resource blocks (Y);

and performing an operation using at least the information specific to the reduced capability wireless device received in the system information.

2. The method of claim 1, wherein:
the system information comprises one or more legacy information elements and one or more extended information elements,
the one or more legacy information elements containing information for a non-reduced capability wireless device, and
the one or more extended information elements containing the information specific to the reduced capability wireless device.

3. The method of claim 1, wherein the system information comprises a system information block, SIB.

4. The method of claim 1, wherein the operation of the reduced capability wireless device comprises accessing the network node.

5. The method of claim 1, wherein the receiving is based on at least one of a puncturing, a repetition, and a combining of resource blocks of the first PDSCH.

6. The method of claim 5, wherein a bandwidth associated with resources used for the PDSCH is wider than a maximum bandwidth supported by the reduced capability wireless device.

7. The method of claim 1, wherein treating the second subset (Z) of resource blocks (Y) as punctured comprises setting values associated with the second subset (Z) of resource blocks (Y) to zero in a decoding process.

8. The method of claim 1, further comprising:
receiving the second subset (Z) of resource blocks (Y) in a second PDSCH, the second subset (Z) of resource blocks (Y) received using a second bandwidth equal to or less than the maximum bandwidth supported by the reduced capability wireless device.

9. The method of claim 8, wherein at least one of:
the second PDSCH comprises a repetition of the first PDSCH by the network node,
the second PDSCH does not comprise a repetition of the first PDSCH by the network node,
the second PDSCH sent by the network node comprises only the resource blocks Z that were punctured by the wireless device when receiving the first PDSCH,
the first bandwidth is the same as the second bandwidth,
the first bandwidth is different than the second bandwidth,
the first bandwidth is wider than the second bandwidth,
the first bandwidth is narrower than the second bandwidth,
values of the second subset (Z) transmitted by the network node are the same in the first PDSCH and the second PDSCH, and
values of the second subset (Z) transmitted by the network node are different in the first PDSCH and the second PDSCH.

10. The method of claim 8, further comprising:
treating the resource blocks (Y) as punctured during the second PDSCH except for the second subset (Z) of the resource blocks (Y).

11. The method of claim 5, further comprising:
alternating a puncturing pattern used during different PDSCHs.

12. The method of claim 1, further comprising:
combining the first subset (X) of resource blocks (Y) obtained when receiving the first PDSCH with the second subset (Z) of resource blocks (Y); and
determining the system information based on decoding the combination of the first subset (X) and the second subset (Z) of resource blocks (Y).

13. The method of claim 12, wherein the second subset (Z) comprises the resource blocks obtained when receiving the second PDSCH.

14. The method of claim 12, wherein the second subset (Z) of resource blocks (Y) received in the second PDSCH comprises punctured resource blocks having the values set to zero in the first PDSCH.

15. The method of claim 1, further comprising:
receiving, via one or more physical downlink control channel, PDCCH, transmissions, downlink control information, DCI, scheduling the system information, and
determining a scheduling of the system information based on the DCI,
wherein the receiving of the system information is performed according to the scheduling received in the DCI, and
wherein the DCI is received based on at least one of a puncturing, a repetition, and a combining of resource blocks of the PDCCH.

16. The method of claim 15, further comprising:
receiving, from the network node, information indicating a configuration of a resource set;
determining whether a bandwidth configured for the resource set is wider than a maximum bandwidth supported by the reduced capability wireless device based on the information indicating the configuration of the resource set; and
in response to determining that the bandwidth configured for the resource set is wider than the maximum bandwidth supported by the reduced capability wireless device, determining the puncturing, repetition, and/or combining of the resource blocks based on the configuration of the resource set.

17. The method of claim 16, wherein the resource set comprises control resource set #0 (CORESET #0).

18. The method of claim 15, wherein the DCI is received according to a format for scheduling transmission of a downlink data channel, wherein a cyclic redundancy check, CRC, value is scrambled by a Radio Network Temporary Identifier, RNTI, specific for the system information.

19. The method of claim 18, wherein at least one of:
the downlink data channel is a physical downlink shared channel, PDSCH,
the format for scheduling the transmission of the downlink data channel is a DCI format 1_0, and
the RNTI specific for the system information is an SI-RNTI.

20. The method of claim 15, wherein the DCI is carried at least in part by a first PDCCH comprising resource blocks ($Y_2$) and receiving the DCI comprises:
receiving a third subset ($X_2$) of resource blocks ($Y_2$), the third subset ($X_2$) of resource blocks ($Y_2$) received using a first bandwidth equal to or less than a maximum bandwidth supported by the reduced capability wireless device.

21. A reduced capability wireless device comprising processing circuitry configured to:
receive, from a network node, system information comprising information specific to the reduced capability wireless device, wherein:

the system information is carried at least in part by a first physical downlink shared channel, PDSCH, comprising resource blocks (Y), and receiving the system information comprises receiving a first subset (X) of resource blocks (Y), the first subset (X) of resource blocks (Y) received using a first bandwidth equal to or less than the maximum bandwidth supported by the reduced capability wireless device;

treating a second subset (Z) of resource blocks (Y) as punctured, the second subset (Z) comprising resource blocks other than the first subset of resource blocks (X), wherein the second subset (Z) comprises all of the resource blocks (Y) except for the first subset (X) of the resource blocks (Y); and perform an operation using at least the information specific to the reduced capability wireless device received in the system information.

22. A method by a network node comprising:

sending system information to a reduced capability wireless device, the system information comprising information specific to the reduced capability wireless device, wherein the system information is carried at least in part by a first physical downlink shared channel, PDSCH, comprising resource blocks (Y), and wherein sending the system information comprises sending a first subset (X) of resource blocks (Y), the first subset (X) of resource blocks (Y) sent using a first bandwidth equal to or less than the maximum bandwidth supported by the reduced capability wireless device;

treating a second subset (Z) of resource blocks (Y) as punctured, the second subset (Z) comprising resource blocks other than the first subset of resource blocks (X), wherein the second subset (Z) comprises all of the resource blocks (Y) except for the first subset (X) of the resource blocks (Y).

23. A network node comprising processing circuitry configured to:

send system information to a reduced capability wireless device, the system information comprising information specific to the reduced capability wireless device, wherein the system information is carried at least in part by a first physical downlink shared channel, PDSCH, comprising resource blocks (Y), and wherein sending the system information comprises sending a first subset (X) of resource blocks (Y), the first subset (X) of resource blocks (Y) sent using a first bandwidth equal to or less than the maximum bandwidth supported by the reduced capability wireless device;

treating a second subset (Z) of resource blocks (Y) as punctured, the second subset (Z) comprising resource blocks other than the first subset of resource blocks (X), wherein the second subset (Z) comprises all of the resource blocks (Y) except for the first subset (X) of the resource blocks (Y).

* * * * *